US012796739B2

(12) United States Patent
Mironov et al.

(10) Patent No.: US 12,796,739 B2
(45) **Date of Patent: *Nov. 17, 2026**

(54) AEROSOL-GENERATING SYSTEM WITH ELECTRODES

(71) Applicant: Altria Client Services LLC, Richmond, VA (US)

(72) Inventors: Oleg Mironov, Neuchatel (CH); Ihar Nikolaevich Zinovik, Peseux (CH); Jerome Christian Courbat, Colombier (CH); Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 143 days.

This patent is subject to a terminal disclaimer.

(21) Appl. No.: 17/306,192

(22) Filed: May 3, 2021

(65) Prior Publication Data

US 2021/0251295 A1 Aug. 19, 2021

Related U.S. Application Data

(63) Continuation of application No. 15/429,726, filed on Feb. 10, 2017, now Pat. No. 11,006,668, which is a (Continued)

(30) Foreign Application Priority Data

Feb. 12, 2016 (EP) .................................... 16155565

(51) Int. Cl.
*A24F 40/51* (2020.01)
*A24F 40/40* (2020.01)
(Continued)

(52) U.S. Cl.
CPC .............. *A24F 40/51* (2020.01); *A24F 40/40* (2020.01); *A24F 40/46* (2020.01); *A24F 40/50* (2020.01);

(Continued)

(58) Field of Classification Search
CPC .......... A24F 40/50; A24F 40/51; A24F 40/10; A24F 40/40; A24F 40/46; G01F 23/26; G01F 23/24
(Continued)

(56) References Cited

U.S. PATENT DOCUMENTS 2,399,636 A 5/1946 Keith
3,326,043 A 6/1967 Roeske
(Continued)

FOREIGN PATENT DOCUMENTS

AU 2013214984 A1 8/2014
CA 2940096 A1 11/2015
(Continued)

OTHER PUBLICATIONS

Machine translation of FR-3003442: Sebban, Electronic inhaler, 2014 (Year: 2014).*

(Continued)

*Primary Examiner* — Woody A Lee, Jr.
*Assistant Examiner* — Abigail H Rhue
(74) *Attorney, Agent, or Firm* — Harness, Dickey & Pierce, P.L.C.

(57) ABSTRACT

An aerosol-generating system includes a liquid storage portion configured to hold a liquid aerosol-forming substrate, a first electrode and a second electrode spaced from the first electrode, an aerosol-generator including one or more aerosol-generating elements and a control system. At least one of the aerosol-generating elements includes one of the first electrode and the second electrode. The first electrode and the second electrode are arranged such that at least a portion of the liquid storage portion is between the first electrode and the second electrode. The control system is configured to measure an electrical quantity between the first electrode and the second electrode and determine the (Continued)

amount of liquid aerosol-forming substrate held in the liquid storage portion based on the measured electrical quantity information.

11 Claims, 5 Drawing Sheets

Related U.S. Application Data continuation of application No. PCT/EP2017/052902, filed on Feb. 9, 2017.

(51) Int. Cl.

| | |
|---|---|
| ***A24F 40/46*** | (2020.01) |
| ***A24F 40/50*** | (2020.01) |
| ***A24F 40/53*** | (2020.01) |
| ***G01F 23/24*** | (2006.01) |
| ***G01F 23/26*** | (2022.01) |
| *A24F 40/10* | (2020.01) |
| *A24F 40/465* | (2020.01) |

(52) U.S. Cl.

CPC .............. *A24F 40/53* (2020.01); *G01F 23/24* (2013.01); *G01F 23/26* (2013.01); *A24F 40/10* (2020.01); *A24F 40/465* (2020.01)

(58) Field of Classification Search

USPC .................. 392/390; 219/433, 432, 535, 438

See application file for complete search history.

(56) References Cited

U.S. PATENT DOCUMENTS

| | | | | |
|---|---|---|---|---|
| 3,952,182 | A | 4/1976 | Flanders | |
| 4,417,473 | A | 11/1983 | Tward et al. | |
| 4,646,569 | A | 3/1987 | Cosser | |
| 4,922,901 | A | 5/1990 | Brooks et al. | |
| 5,083,383 | A | 1/1992 | Heger | |
| 5,095,921 | A | 3/1992 | Losee et al. | |
| 5,530,225 | A | 6/1996 | Hajaligol | |
| 5,865,185 | A | 2/1999 | Collins et al. | |
| 6,273,342 | B1 | 8/2001 | Terada et al. | |
| 6,474,156 | B1 | 11/2002 | Endo et al. | |
| 7,779,831 | B1 | 8/2010 | Von Hollen et al. | |
| 9,668,522 | B2 | 6/2017 | Memari et al. | |
| 9,681,688 | B1 | 6/2017 | Rinehart et al. | |
| 9,993,025 | B2 | 6/2018 | Alarcon et al. | |
| 10,588,176 | B2 | 3/2020 | Marsh et al. | |
| 10,687,552 | B2 * | 6/2020 | Zinovik | H05B 3/145 |
| 10,736,357 | B2 * | 8/2020 | Hon | G01F 23/292 |
| 10,757,976 | B2 | 9/2020 | Mironov et al. | |
| 10,952,473 | B2 | 3/2021 | Bessant et al. | |
| 11,006,668 | B2 | 5/2021 | Mironov et al. | |
| 11,013,268 | B2 | 5/2021 | Bessant et al. | |
| 11,363,682 | B2 | 6/2022 | Mironov et al. | |
| 11,602,019 | B2 | 3/2023 | Reevell | |
| 11,837,975 | B2 | 12/2023 | Kubota et al. | |
| 2003/0000303 | A1 | 1/2003 | Livingston et al. | |
| 2004/0029366 | A1 | 2/2004 | Jakoby | |
| 2005/0016549 | A1 | 1/2005 | Banerjee et al. | |
| 2005/0229700 | A1 | 10/2005 | Chai et al. | |
| 2007/0216424 | A1 | 9/2007 | Sieh et al. | |
| 2009/0199635 | A1 | 8/2009 | Jacobson et al. | |
| 2010/0074602 | A1 | 3/2010 | Israelsohn et al. | |
| 2011/0083504 | A1 | 4/2011 | Unger | |
| 2011/0113878 | A1 | 5/2011 | Ohshima et al. | |
| 2011/0240475 | A1 | 10/2011 | Hother et al. | |
| 2012/0199663 | A1 | 8/2012 | Qiu | |
| 2013/0066168 | A1 | 3/2013 | Yang et al. | |
| 2013/0192615 | A1 | 8/2013 | Tucker et al. | |
| 2013/0319435 | A1 | 12/2013 | Flick | |
| 2013/0341218 | A1 | 12/2013 | Liu | |
| 2014/0000638 | A1 | 1/2014 | Sebastian et al. | |
| 2014/0041655 | A1 | 2/2014 | Barron et al. | |
| 2014/0150810 | A1 | 6/2014 | Hon | |
| 2014/0191054 | A1 | 7/2014 | Hingley et al. | |
| 2014/0290650 | A1 | 10/2014 | Ivey | |
| 2014/0352428 | A1 | 12/2014 | Kato | |
| 2015/0122015 | A1 | 5/2015 | Leppard | |
| 2015/0181945 | A1 | 7/2015 | Tremblay | |
| 2015/0189919 | A1 | 7/2015 | Liu | |
| 2015/0208729 | A1 * | 7/2015 | Monsees | A24F 40/485 131/329 |
| 2015/0235546 | A1 | 8/2015 | Stapleford | |
| 2015/0257445 | A1 | 9/2015 | Henry, Jr. et al. | |
| 2015/0257448 | A1 | 9/2015 | Lord | |
| 2015/0366266 | A1 | 12/2015 | Chen | |
| 2016/0025545 | A1 | 1/2016 | Saltzgiver et al. | |
| 2016/0029698 | A1 | 2/2016 | Xiang | |
| 2016/0106936 | A1 | 4/2016 | Kimmel | |
| 2016/0158782 | A1 | 6/2016 | Henry, Jr. et al. | |
| 2016/0192712 | A1 | 7/2016 | Memari et al. | |
| 2016/0213065 | A1 | 7/2016 | Wensley et al. | |
| 2016/0235122 | A1 | 8/2016 | Krietzman | |
| 2016/0310684 | A1 | 10/2016 | McCullough | |
| 2016/0338407 | A1 | 11/2016 | Kerdemelidis | |
| 2016/0345628 | A1 | 12/2016 | Sabet | |
| 2017/0020197 | A1 | 1/2017 | Cameron | |
| 2017/0027229 | A1 | 2/2017 | Cameron | |
| 2017/0027233 | A1 | 2/2017 | Mironov | |
| 2017/0048927 | A1 | 2/2017 | Murison et al. | |
| 2017/0048930 | A1 | 2/2017 | Marsh et al. | |
| 2017/0064997 | A1 | 3/2017 | Murison et al. | |
| 2017/0099878 | A1 | 4/2017 | Murison et al. | |
| 2017/0156397 | A1 | 6/2017 | Sur et al. | |
| 2017/0231276 | A1 | 8/2017 | Mironov et al. | |
| 2017/0231278 | A1 | 8/2017 | Mironov et al. | |
| 2017/0245552 | A1 | 8/2017 | Reevell | |
| 2017/0295846 | A1 | 10/2017 | Liu | |
| 2018/0049469 | A1 * | 2/2018 | Kaufman | G01D 5/24 |
| 2018/0177238 | A1 | 6/2018 | Bessant et al. | |
| 2018/0242644 | A1 | 8/2018 | Bessant et al. | |
| 2021/0199432 | A1 | 7/2021 | Bessant et al. | |
| 2021/0251295 | A1 | 8/2021 | Mironov et al. | |
| 2021/0293600 | A1 | 9/2021 | Bessant et al. | |
| 2022/0248503 | A1 | 8/2022 | Mironov et al. | |
| 2023/0209662 | A1 | 6/2023 | Reevell | |

FOREIGN PATENT DOCUMENTS

| | | | | |
|---|---|---|---|---|
| CN | 103338664 A | | 10/2013 | |
| CN | 104010529 A | | 8/2014 | |
| CN | 104413544 A | | 3/2015 | |
| CN | 104799438 A | * | 7/2015 | A24F 40/50 |
| CN | 204579886 U | | 8/2015 | |
| CN | 204838003 U | | 12/2015 | |
| CN | 204949519 U | | 1/2016 | |
| CN | 105939625 A | | 9/2016 | |
| CN | 205667358 U | | 11/2016 | |
| CN | 106455704 A | | 2/2017 | |
| CN | 106455707 A | | 2/2017 | |
| CN | 110248562 A | | 9/2019 | |
| DE | 19645970 A1 | | 5/1998 | |
| EP | 0516293 A1 | | 12/1992 | |
| EP | 2399636 A1 | | 12/2011 | |
| EP | 2399696 A1 | | 12/2011 | |
| EP | 2468116 A1 | | 6/2012 | |
| EP | 2756859 A1 | | 7/2014 | |
| EP | 2493342 B1 | | 12/2014 | |
| EP | 2959786 A1 | | 12/2015 | |
| EP | 3413734 B1 | | 11/2021 | |
| FR | 3003442 A1 | * | 9/2014 | A24F 47/008 |
| GB | 1071656 A | | 6/1967 | |
| GB | 2533652 A | | 6/2016 | |
| IN | 9851/ | | 5/2013 | |
| IN | 9851/CHENP/2011 | | 5/2013 | |
| JP | S55-147342 A | | 11/1980 | |
| JP | 58066719 | | 4/1983 | |
| JP | S59-111031 A | | 6/1984 | |
| JP | H04-350550 A | | 12/1992 | |
| JP | H11-033097 A | | 2/1999 | |
| JP | 2007-218797 A | | 8/2007 | |

(56) References Cited

FOREIGN PATENT DOCUMENTS

| | | | | |
|---|---|---|---|---|
| JP | 2009-150738 A | 7/2009 | | |
| JP | 2009-295329 A | 12/2009 | | |
| JP | 2010-097740 A | 4/2010 | | |
| JP | 2014-501107 A | 1/2014 | | |
| JP | 2014-232002 A | 12/2014 | | |
| JP | 2015-512262 A | 4/2015 | | |
| JP | 2015-524257 A | 8/2015 | | |
| JP | 2015-532136 A | 11/2015 | | |
| JP | 2017-510270 A | 4/2017 | | |
| KR | 10-2012-0080286 A | 7/2012 | | |
| KR | 10-2012-0080287 A | 7/2012 | | |
| KR | 10-2015-0064754 A | 6/2015 | | |
| RU | 2517125 C2 | 5/2014 | | |
| RU | 2573948 C2 | 1/2016 | | |
| RU | 2604012 C2 | 12/2016 | | |
| WO | WO-2014120479 A1 | 8/2014 | | |
| WO | WO-2014159982 A1 | 10/2014 | | |
| WO | WO-2015/128665 A1 | 9/2015 | | |
| WO | WO-2015/140312 A1 | 9/2015 | | |
| WO | WO-2015151053 A2 * | 10/2015 | ........... | A24F 47/008 |
| WO | 2015/167000 A1 | 11/2015 | | |
| WO | WO-2015/177257 A1 | 11/2015 | | |
| WO | WO-2015177046 A1 | 11/2015 | | |
| WO | WO-2016/150922 A2 | 9/2016 | | |
| WO | WO-2017/045897 A1 | 3/2017 | | |
| WO | 2017/137512 A1 | 8/2017 | | |
| WO | WO-2017137505 A1 | 8/2017 | | |
| WO | WO-2017/214517 A1 | 12/2017 | | |
| WO | WO-2018/114849 A1 | 6/2018 | | |
| WO | 2018158081 A1 | 9/2018 | | |

OTHER PUBLICATIONS

Machine translation of CN-104799438: Li, A low-temperature heating heater for electronic cigarette smoking devices, 2015 (Year: 2015).*

Japanese Decision to Grant for corresponding Application No. 2018-537765, dated Jul. 12, 2021.

Notice of Allowance dated Jul. 20, 2023 issued in related Korean patent application No. 10- 2019-7016364, with English translation.

European Search Report for European Patent Application No. 16155568.5 Dated Aug. 9, 2016.

International Search Report for corresponding International application No. PCT/EP2017/052921 dated May 17, 2017.

Russian Notice of Allowance and Search Report for corresponding Application No. 2018132263, dated Feb. 28, 2020, English translation thereof.

First Office Action and Search Report issued Sep. 2, 2020 in Chinese Application No. 201780006966.8.

Notice of Allowance dated Feb. 4, 2021 issued in corresponding Japanese Patent Application No. 2018-540739.

U.S. Office Action dated Oct. 6, 2022 for corresponding U.S. Appl. No. 17/728,154.

Notice of Allowance dated Jan. 26, 2023 issued in related U.S. Appl. No. 17/728,154.

Extended European Search Report #16206381.2 dated Jun. 9, 2017.

Jacques Robert et al. "A Second-Order High-Resolution Incremental A/D Converter with Offset and Charge Injection Compensation". IEEE Journal of Solid-State Circuits, vol. 23, No. 3. Jun. 1988. pp. 736-741.

Alexander V. Mamishev et al. "Interdigital Sensors and Transducers". Proceedings of the IEEE, vol. 92, No. 5. May 2004. pp. 808-845.

David Wang, "TI Designs: Capacitive-Based Liquid Level Sensing Sensor Reference Design". Texas Instruments Incorporated. Jan. 2015. pp. 1-23.

International Preliminary Report and Written Opinion for corresponding PCT Application No. PCT/EP2017/083386 dated Jul. 4, 2019.

Extended European Search Report #17158521.9 dated Sep. 13, 2017.

International Preliminary Report on Patentability for International Application No. PCT/EP2018/053725 mailed on Sep. 12, 2019.

International Search Report and Written Opinion for International Application No. PCT/EP2018/053725 mailed on May 18, 2018.

Written Opinion of the International Searching Authority for International Application No. PCT/EP2018/053725 mailed on May 18, 2018.

European Office Action dated Oct. 8, 2020 issued in corresponding European Patent Application No. 18705147.9.

U.S. Office Action dated Nov. 6, 2020 issued in co-pending U.S. Appl. No. 15/908,074.

U.S. Office Action dated May 22, 2020 issued in co-pending U.S. Appl. No. 15/908,074.

Notice of Allowance in co-pending U.S. Appl. No. 15/850,278 dated Nov. 30, 2020.

U.S. Notice of Allowance dated Jan. 28, 2021 issued in co-pending U.S. Appl. No. 15/908,074.

U.S. Office Action dated May 19, 2020 issued in U.S. Appl. No. 15/850,278.

Russian Office action and Search report issued in Application No. 2019118259/03(034983), dated Apr. 19, 2021.

Russian Office action and Search report issued in Application No. 2019126802, dated Jun. 4, 2021.

Chinese Office Action dated Aug. 24, 2021 issued in corresponding Chinese Patent Application No. 201780073684.X. English translation is enclosed.

Chinese Office Action dated Nov. 3, 2021 issued in corresponding Chinese Patent Application No. 201880009882.4. English translation has been included.

Russian Decision to Grant for corresponding Application No. 2019118259/03(034983), dated Nov. 24, 2021, English translation has been included.

Japanese Office Action dated Dec. 20, 2021 issued in corresponding Japanese Patent Application No. 2019-531461. English translation has been provided.

Japanese Office Action dated Feb. 9, 2022 issued in Japanese Patent Application No. 2019-541785. English translation has been provided.

Office Action dated Feb. 9, 2022 issued in corresponding Japanese Patent Application No. 2019-541785.

Russian Decision to Grant for corresponding Application No. 2019126802/03(052556), dated Mar. 28, 2022, English translation has been included.

Decision to Grant dated Aug. 1, 2022 issued in Japanese Patent Application No. 2019-531461. English translation has been provided.

Japanese Notice of Allowance dated Nov. 24, 2022 for corresponding Japanese Application No. 2019-541785, and English-language translation thereof.

Korean Office Action dated Nov. 1, 2022 for corresponding Korean Application No. 10-2019-7020653, and English-language translation thereof.

Korean Office Action for corresponding Application No. 10-2019-7016364, dated Dec. 16, 2022, with English translation included.

Korean Notice of Allowance for corresponding Application No. 10-2019-7020653, dated Jan. 13, 2023, with English Translation.

U.S. Notice of Allowance dated Apr. 28, 2023, for corresponding U.S. Appl. No. 17/728,154.

European Search Report for Application No. EP16155565 dated Aug. 9, 2016.

International Search Report and Written Opinion for corresponding International Application No. PCT/EP2017/052902 dated Apr. 24, 2017.

International Preliminary Report on Patentability issued Apr. 30, 2018 in International Application No. PCT/EP2017/052902.

Russian Notice of Allowance and Search Report for corresponding Application No. 2018129581, dated Mar. 5, 2020, English translation thereof.

Written Opinion of the International Preliminary Examining authority issued Jan. 26, 2018 in International Application No. PCT/EP2017/052902.

First Office Action issued Sep. 2, 2020 in Chinese Application No. 201780007223.2.

(56) References Cited

OTHER PUBLICATIONS

Office Action dated Feb. 8, 2021 issued in corresponding Japanese Patent Application No. 2018-537765.
Office Action dated Oct. 5, 2023 issued in related U.S. Appl. No. 17/728,154.
Notice of Allowance dated Oct. 27, 2023 issued in related U.S. Appl. No. 18/298,757.
Office Action issued Feb. 1, 2024 in Japanese Application No. 2022-206266.
Decision to grant issued Apr. 4, 2024 in Japanese Application No. 2022-206266.
Notice of Allowance dated Apr. 10, 2024 issued in U.S. Appl. No. 18/298,757.
Office Action dated Nov. 24, 2023 issued in related U.S. Appl. No. 18/298,757.
Notice of Allowance dated Feb. 1, 2024 issued in corresponding U.S. Appl. No. 17/897,831.
Notice of Allowance dated Feb. 20, 2024 issued in corresponding U.S. Appl. No. 17/728,154.
Notice of Allowance dated May 10, 2024 issued in U.S. Appl. No. 18/298,757.
Notice of Allowance dated May 16, 2024 issued in U.S. Appl. No. 17/728,154.
U.S. Office Action for U.S. Appl. No. 17/204,490, dated Aug. 1, 2024.
U.S. Office Action for U.S. Appl. No. 18/322,027, dated Aug. 6, 2024.
Office Action dated May 1, 2024 issued in Korean patent application No. 2018-7021321.
Office Action dated Dec. 1, 2024 issued in Korean patent application No. 10-2024-7036990.
Office Action dated Jan. 28, 2025 issued in U.S. Appl. No. 17/230,463.
Notice of Allowance dated Feb. 6, 2025 issued in U.S. Appl. No. 17/204,490.
Notice of Allowance dated Feb. 6, 2025 issued in U.S. Appl. No. 18/298,757.
Notice of Allowance dated Feb. 7, 2025 issued in U.S. Appl. No. 17/728,154.
Notice of Allowance dated Dec. 16, 2024 issued in Korean patent application No. 10-2018-70210008.
Notice of Allowance dated Dec. 23, 2024 issued in U.S. Appl. No. 17/897,831.
Written Decision on Registration issued Aug. 6, 2024 in Korean Application No. 10-2018-7021321.
Notice of Allowance dated Sep. 4, 2024 issued in U.S. Appl. No. 17/728,154.
Office Action dated Oct. 23, 2024 issued in U.S. Appl. No. 17/728,154.
Office Action dated Oct. 23, 2024 issued in U.S. Appl. No. 18/298,757.
Notice of Allowance issued Nov. 18, 2024 in U.S. Appl. No. 17/204,490.
Office Action dated Nov. 27, 2024 issued in U.S. Appl. No. 18/322,027.
Notice of Allowance dated Aug. 14, 2025 issued in U.S. Appl. No. 17/230,463.
Notice of Allowance dated Aug. 28, 2025 issued in U.S. Appl. No. 18/322,027.
Notice of Allowance dated Apr. 7, 2025 issued in U.S. Appl. No. 17/897,831.
Office Action dated Sep. 16, 2025 issued in U.S. Appl. No. 18/318,196.
Office Action dated May 14, 2025 issued in U.S. Appl. No. 18/185,775.
Notice of Allowance dated May 12, 2025 issued in U.S. Appl. No. 17/230,463.
Notice of Allowance dated Jun. 24, 2025 issued in U.S. Appl. No. 17/204,490.
Notice of Allowance dated Jun. 2, 2025 issued in U.S. Appl. No. 17/204,490.
Office Action dated Jun. 3, 2025 issued in U.S. Appl. No. 17/728,154.
Office Action dated Jun. 3, 2025 issued in U.S. Appl. No. 18/298,757.
Office Action dated Mar. 29, 2025 issued in Chinese Patent Application No. 202210914458.2.
Notice of Allowance dated Apr. 1, 2025 issued in Korean patent application No. 10-2024-7036990.
Notice of Allowance dated Apr. 23, 2025 issued in U.S. Appl. No. 17/204,490.
Notice of Allowance dated Apr. 24, 2025 issued in U.S. Appl. No. 17/728,154.
Notice of Allowance dated Apr. 28, 2025 issued in U.S. Appl. No. 18/298,757.
Notice of Allowance dated Dec. 3, 2025, issued in U.S. Appl. No. 17/230,463.
Notice of Allowance dated Dec. 12, 2025, issued in U.S. Appl. No. 17/204,490.
Notice of Allowance dated Jan. 2, 2026 issued in U.S. Appl. No. 17/204,490.
Office Action dated Nov. 10, 2025 issued in U.S. Appl. No. 17/897,831.
Final Office Action issued Dec. 1, 2025 in U.S. Appl. No. 18/185,775.
Final Office Action issued Mar. 11, 2026 in U.S. Appl. No. 18/318,196.
Russian Notice of Allowance for corresponding Application No. 2022114504, dated Mar. 13, 2026, English translation thereof.
Notice of Allowance dated Mar. 30, 2026, issued in U.S. Appl. No. 17/897,831.
Office action and search report issued on Oct. 17, 2025 in Russian application No. 2022114504/03.
Office Action dated Aug. 29, 2024 issued in U.S. Appl. No. 17/230,463.
Notice of Allowance dated Sep. 4, 2024 issued in U.S. Appl. No. 18/298,757.

* cited by examiner

AEROSOL-GENERATING SYSTEM WITH ELECTRODES

This application is a continuation of U.S. application Ser. No. 15/429,726, filed Feb. 10, 2017, which is a continuation of and claims priority to PCT/EP2017/052902 filed on Feb. 9, 2017, and further claims priority to EP 16155565.1 filed on Feb. 12, 2016; the entire contents of each of which are hereby incorporated by reference thereto.

BACKGROUND

At least one example embodiment relates to aerosol-generating systems and cartridges for aerosol-generating systems. The aerosol-generating systems may be electrically operated vaping systems.

One type of aerosol-generating system is an electrically operated vaping system. Electrically operated vaping systems may comprise a liquid aerosol-forming substrate, which is heated to form an aerosol. Electrically operated vaping systems often comprise a power supply, a liquid-storage portion for holding a supply of liquid aerosol-forming substrate and a heater. The heater may comprise a coil of heater wire wound around an elongate wick soaked in a liquid aerosol-forming substrate.

Liquid aerosol-forming substrate is consumed during vaping of an aerosol-generating system and often requires replacing, either by refilling a liquid storage portion or by replacing a cartridge comprising a liquid storage portion.

It would be desirable for an aerosol-generating system to provide an adult vaper with an accurate determination of the amount of liquid aerosol-forming substrate held in a liquid storage portion. It would be desirable for an aerosol-generating system to accurately monitor the amount of liquid aerosol-forming substrate that is held in the liquid storage portion.

SUMMARY

In at least one example embodiment, an aerosol-generating system comprises a liquid-storage portion for holding a liquid aerosol-forming substrate; a first electrode and a second electrode spaced from the first electrode; and a control system. The first electrode and the second electrode are arranged such that at least a portion of the liquid storage portion is arranged between the first electrode and the second electrode. The control system is configured to measure an electrical quantity between the first electrode and the second electrode and determine the amount of liquid aerosol-forming substrate held in the liquid storage portion based on the measured electrical quantity information.

Measuring the electrical quantity between the first and second electrodes may enable an accurate and reliable determination of the amount of liquid aerosol-forming substrate held in the liquid storage portion.

BRIEF DESCRIPTION OF THE DRAWINGS

Embodiments will not be described, by way of example only, with reference to the accompanying drawings.

DETAILED DESCRIPTION

Figure 1:
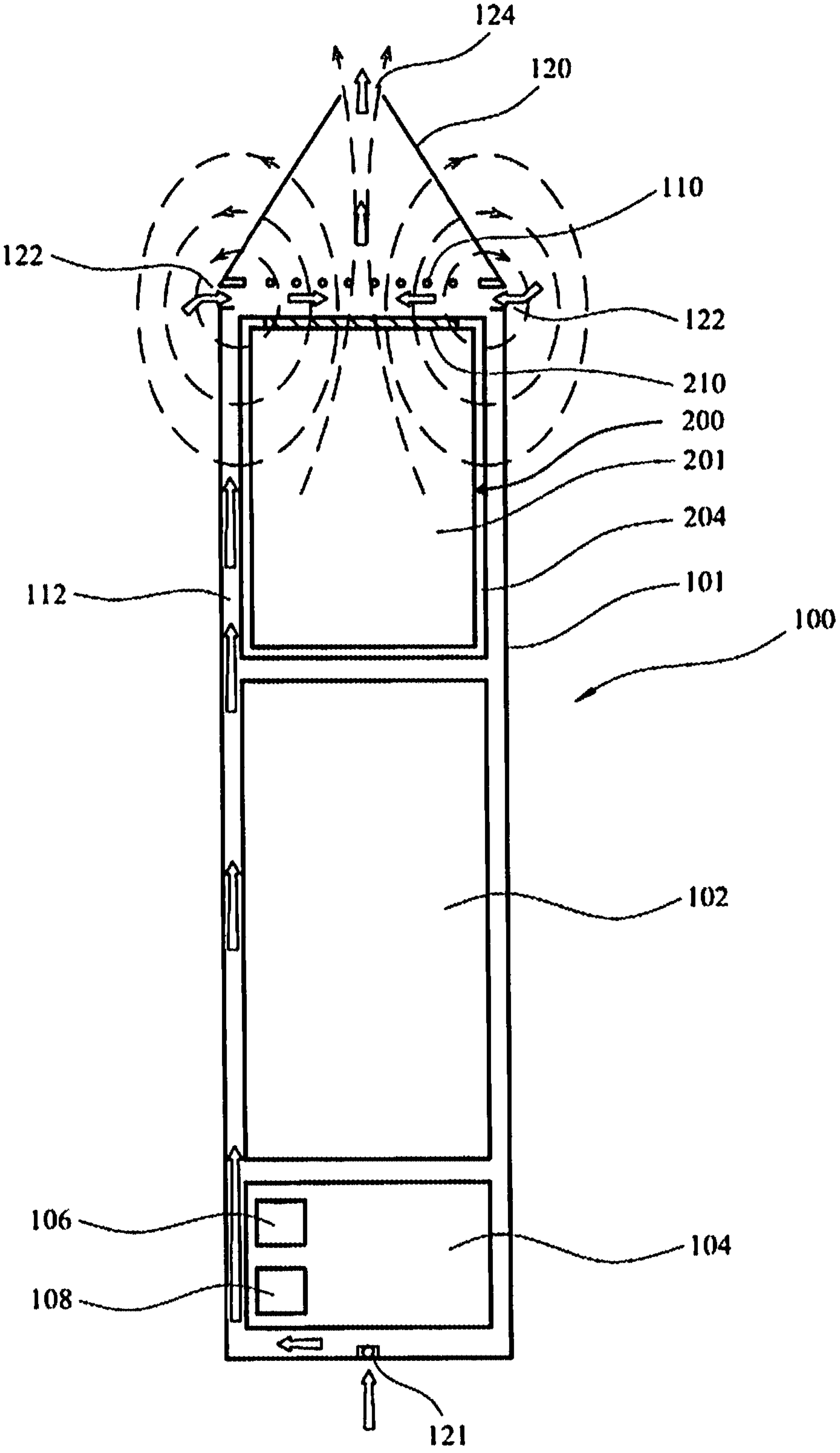
FIG. 1 is a schematic illustration of an aerosol-generating system according to at least one example embodiment.

Various example embodiments will now be described more fully with reference to the accompanying drawings in which some example embodiments are shown. However, specific structural and functional details disclosed herein are merely representative for purposes of describing example embodiments. Thus, the embodiments may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures. Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term “and/or” includes any and all combinations of one or more of the associated listed items.

It will be understood that, if an element is referred to as being “connected” or “coupled” to another element, it can be directly connected, or coupled, to the other element or intervening elements may be present. In contrast, if an element is referred to as being “directly connected” or “directly coupled” to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

In order to more specifically describe example embodiments, various features will be described in detail with reference to the attached drawings. However, example embodiments described are not limited thereto.

As used herein with reference to at least one example embodiments, the term 'electrical quantity' is used to describe any electrical property, parameter or attribute that can be quantified by measurement. For example, suitable 'electrical quantities' include current, voltage, impedance, capacitance and resistance. The control system may be configured to measure at least one of impedance, capacitance and resistance between the first electrode and the second electrode.

As used herein with reference to at least one example embodiment, the term 'amount' is used to describe the mass, quantity or proportion of liquid aerosol-forming substrate held in the liquid storage portion. The determined amount of liquid aerosol-forming substrate held in the liquid storage portion may comprise an absolute or a relative value. The determined amount of liquid aerosol-forming substrate may comprise a volume, such as a value in liters. The determined amount of liquid aerosol-forming substrate held in the liquid storage portion may comprise a fraction or a percentage, for example, with 1 or 100% indicating a full liquid storage portion and 0 or 0% indicating an empty liquid storage portion.

The liquid storage portion may be configured to hold both liquid aerosol-forming substrate and air. The liquid aerosol-forming substrate may have substantially different electrical properties to air. The electrical properties of the liquid storage portion may depend on the amount of liquid aerosol-forming substrate held in the liquid storage portion and the amount of air held in the liquid storage portion.

The liquid storage portion may also comprise one or more of a carrier material for holding the liquid aerosol-forming substrate and a housing for holding the liquid aerosol-forming substrate. The liquid aerosol-forming substrate, air, carrier material and housing may have different electrical properties.

The first and second electrodes may be arranged such that liquid aerosol-forming substrate held in the liquid storage portion is arranged between the first and second electrodes. The first and second electrodes may also be arranged such that one or more of the air held in the liquid storage portion, the carrier material and the housing are arranged between the first and second electrodes. The first and second electrodes may be arranged in contact with liquid aerosol-forming substrate held in the liquid storage portion. The first and second electrodes may be arranged in contact with the carrier material. The first and second electrodes may be arranged in contact with the housing.

When the liquid storage portion is full, the liquid storage portion may hold predominantly liquid aerosol-forming substrate. During vaping, liquid aerosol-forming substrate may be consumed from the liquid storage portion and replaced with air. When the liquid storage portion is empty, the liquid storage portion may hold predominantly air. Where the liquid storage portion comprises a carrier material, the liquid storage portion may hold a combination of liquid aerosol-forming substrate, air and the carrier material. The liquid storage portion may be refilled, replacing air in the liquid storage portion with liquid aerosol-forming substrate. The electrical properties of the liquid storage portion may change during use, as the ratio of liquid aerosol-forming substrate to air held in the liquid storage portion changes.

The liquid storage portion may comprise an electrical load. The liquid storage portion may comprise at least one of a resistive load and a capacitive load. Advantageously, electrical quantities of resistive and capacitive loads may be measured without requiring complex electronics.

The aerosol-generating system is configured to monitor an electrical property of the liquid storage portion. This is achieved by arranging at least a portion of the liquid storage portion between the first electrode and the second electrode and by configuring the control system to measure an electrical quantity between the first electrode and the second electrode. The control system is configured to measure an electrical quantity across at least a portion of the liquid storage portion. The control system is further configured to determine the amount of liquid aerosol-forming substrate held in the liquid storage portion based on the measured electrical quantity information.

The control system may be configured to determine the amount of liquid aerosol-forming substrate held in the liquid storage portion by calculation. The calculation may use the measured electrical quantity information. The control system may not be required to store or retrieve historical measurement data to perform the determination.

The electrical quantity measured by the control system may change in a predictable manner with the amount of liquid aerosol-forming substrate held in the liquid storage portion. In at least one example embodiment, the amount of liquid aerosol-forming substrate held in the liquid storage portion may be substantially inversely proportional to the resistance measured by the control system between the first electrode and the second electrode. In at least one example embodiment, the amount of liquid aerosol-forming substrate held in the liquid storage portion may be substantially proportional to the capacitance measured by the control system between the first electrode and the second electrode. This may enable the determination of the amount of liquid aerosol-forming substrate by to be accurate and reliable. The relationship between the measured electrical quantity and the amount of liquid aerosol-forming substrate held in the liquid storage portion may be dependent on the arrangement of the first electrode and the second electrode relative to each other and the liquid storage portion.

The control system may be configured to determine the amount of liquid aerosol-forming substrate held in the liquid storage portion by comparison. The control system may be able to perform a comparison faster than a calculation. The control system may be configured to compare the measured electrical quantity information to reference electrical quantity information stored in the control system.

Reference electrical quantity information may be stored in a memory of the control system. The reference electrical quantity information may be electrical quantity information measured by the control system and stored in a memory of the control system. The reference electrical quantity information may be associated with liquid aerosol-forming substrate amount information. This may enable the determination of the amount of liquid aerosol-forming substrate held in the liquid storage portion to be reliable.

The reference electrical quantity information may comprise a plurality of ranges of reference electrical quantity information. Each range of the reference electrical quantity information may be associated with a liquid aerosol-forming substrate amount. The control system may be configured to compare and match measured electrical quantity information to a stored range of reference electrical quantity information.

The reference electrical quantity information may be stored in a lookup table. The lookup table may comprise stored reference electrical quantity information and stored liquid aerosol-forming substrate amount information. The stored reference electrical quantity information may be associated with the stored liquid aerosol-forming substrate amount information. The stored liquid aerosol-forming substrate amount information may comprise one or more of volume information and fractional fill information.

The control system may be configured to indicate to an adult vaper the determined amount of liquid aerosol-forming substrate held in the liquid storage portion.

The aerosol-generating system may further comprise an aerosol-generator configured to receive liquid aerosol-forming substrate from the liquid storage portion. The control system may be configured to compare the determined amount of liquid aerosol-forming substrate to a desired (or, alternatively a predetermined) threshold amount stored in the control system. The control system may be configured to prevent operation of the aerosol-generator when the determined amount of liquid aerosol-forming substrate is below the desired (or, alternatively a predetermined) threshold. This may substantially disable or inhibit operation of the aerosol-generator when there is insufficient liquid aerosol-forming substrate for the aerosol-generating system to function as intended. In at least one example embodiment, if insufficient liquid aerosol-forming substrate is held in the liquid storage portion, liquid aerosol-forming substrate may not be received by the aerosol-generator. Activation of the aerosol-generator without sufficient liquid aerosol-forming substrate may result in generation of an aerosol comprising undesirable constituents. In at least one example embodiment, if insufficient liquid aerosol-forming substrate is received by the aerosol-generator, activation of the aerosol-generator may result in an undesirable increase in temperature of the aerosol-generator that may damage the aerosol-generator. The control system may be configured to disable and/or substantially prevent operation of the aerosol-generator if the determined amount of liquid aerosol-forming substrate held in the liquid storage portion is below a desired (or, alternatively a predetermined) threshold amount. This may improve the adult vaper experience and prolong the life of the aerosol-generator.

The control system may be configured to measure the electrical quantity between the first and second electrode and determine the amount of liquid aerosol-forming substrate held in the liquid storage portion independently of the operation the aerosol-generator. This may enable the control system to disable and/or substantially prevent operation of the aerosol-generator before the aerosol-generator is operated. This may further prolong the life of the aerosol-generator.

The desired (or, alternatively a predetermined) threshold amount may be set in the factory or by an adult vaper before vaping. The desired (or, alternatively a predetermined) threshold amount may be any suitable amount. The desired (or, alternatively a predetermined) threshold amount may range from about 1% to about 15% of the liquid storage portion volume, or from about 3% to 10%. The threshold amount may be about 5%. In at least one example embodiment, for a liquid storage portion configured to hold about 2 ml of liquid aerosol-forming substrate, the desired (or, alternatively a predetermined) threshold amount may range from about 0.1 ml to about 0.3 ml. The desired (or, alternatively a predetermined) threshold amount may be dependent on the volume of the liquid storage portion. The desired (or, alternatively a predetermined) threshold amount may range from about 0.1 ml to about 10 ml, or range from about 0.5 ml to about 5 ml. In at least one example embodiment, the threshold amount may be about 0.5 ml.

The control system may be configured to reduce and/or substantially prevent operation of the aerosol-generator in any suitable manner. The control system may be configured to send a control signal to the aerosol-generator to reduce and/or substantially prevent operation. The control system may be configured to reduce and/or substantially prevent power from being supplied to the aerosol-generator.

The control system may be configured to disable the aerosol-generator. The control system may be configured to reversibly disable the aerosol-generator. The control system may be configured to enable the aerosol-generator if the determined amount is above the desired (or, alternatively a predetermined) threshold amount. The control system may be configured to irreversibly disable the aerosol-generator. The control system may be configured to damage or break a frangible connection between the aerosol-generator and a power supply.

The first electrode and the second electrode may be arranged at any suitable location relative to the liquid storage portion. The first electrode and the second electrode may be arranged at or in the liquid storage portion. The first electrode and the second electrode may be arranged at or on the housing. Where the housing of the liquid storage portion forms a cavity for holding the liquid aerosol-forming substrate, the first electrode and the second electrode may be arranged at or in the cavity.

The aerosol-generating system may comprise one or more pairs of first and second electrodes. The aerosol-generating system may comprise two or more pairs of electrodes arranged such that different portions of the liquid storage portion are arranged between the first and second electrodes. Providing multiple pairs of electrodes may improve the reliability of the measurements. The one or more pairs of first and second electrodes may comprise part of a sensor.

The electrodes may be any suitable type of electrode. In at least one example embodiment, suitable types of electrodes include point electrodes, ring electrodes, plate electrodes or track electrodes. The first electrode and the second electrode may be the same type of electrode. The first electrode and the second electrode may be different types of electrode.

The electrodes may by any suitable shape. In at least one example embodiment, the electrodes may be: square, rectangular, curved, arcuate, annular, spiral or helical. The electrodes may be substantially cylindrical. The electrodes may comprise one or more sections that are substantially linear, non-linear, planar or non-planar. The electrodes may be rigid. This may enable the electrodes to maintain their shape. The electrodes may be flexible. This may enable the electrodes to conform to the shape of the liquid storage portion. The electrodes may be configured to conform to the shape of a housing of the liquid storage portion.

The electrodes may have a length, a width, and a thickness. The length of the electrodes may be substantially greater than the width of the electrodes. In other words, the electrodes may be elongate. The thickness of the electrodes may be substantially less than the length and the width of the electrodes. In other words, the electrodes may be thin. Thin electrodes and elongate electrodes may have a larger surface area to volume ratio. This may improve the sensitivity of measurements.

The electrodes may comprise any suitable material. The electrodes may comprise any suitable electrically conductive material. Suitable electrically conductive materials include metals, alloys, electrically conductive ceramics and electrically conductive polymers. As used herein with respect to at least one example embodiment, an electrically conductive material refers to a material having a volume resistivity at 20 °C of less than about $1\times10^{-5}$ Ωm or ranging from about $1\times10^{-5}$ Ωm to about $1\times10^{-9}$ Ωm. The materials may include gold and platinum. The electrodes may be coated with a passivation layer. The electrodes may comprise or be coated in material that is sufficiently non-reactive so as not to react with or contaminate the liquid aerosol-forming substrate. The electrodes may comprise transparent or translucent material. In at least one example embodiment, a suitable transparent material may be Indium Tin Oxide (ITO).

The electrodes may be arranged in any suitable arrangement relative to the liquid storage portion. The electrodes may be arranged in the liquid storage portion. The first electrode and the second electrode may be arranged at opposite sides of the liquid storage portion. The first electrode and the second electrode may be arranged at opposite ends of the liquid storage portion. Where the liquid-storage portion comprises a carrier material, the electrodes may be arranged in contact with the carrier material. Where the liquid storage portion comprises a housing, at least one of the first and second electrodes may be arranged at the housing or in contact with the housing. The first and second electrodes may be substantially cylindrical. The first electrode may be arranged to substantially surround the second electrode. The first and second electrodes may be arranged concentrically about a common axis.

At least one of the first electrode and the second electrode may be arranged on a platform. The platform may comprise electrically insulating material. Where the liquid storage portion comprises a housing, the platform may be separate from the housing. The platform may be arranged on the housing. The platform may form a portion of the housing. The platform may comprise the same material as the housing. The platform may comprise a different material to the housing.

The platform may comprise any suitable electrically insulating material. For example, suitable electrically insulating materials include glasses, plastics and ceramic materials. As used herein with respect to at least one example embodiment, an electrically insulating material refers to a material having a volume resistivity at 20 °C of greater than about $1\times10^6$ Ωm or ranging from about $1\times10^9$ Ωm to about $1\times10^{21}$ Ωm.

The electrodes may be secured on the platform. The electrodes may be secured on the platform by any suitable means. In at least one example embodiment, the electrodes may be secured on the platform by a bonding material, such as an adhesive. The electrodes may be deposited on the platform by any suitable method of deposition. The electrodes may be etched in the platform.

The second electrode may be spaced apart from the first electrode. This may reduce substantially and/or prevent direct contact between the first electrode and the second electrode. The spacing between the first electrode and the second electrode may be consistent along the length of the first electrode and the second electrode. Where the first electrode and the second electrode are arranged at opposite sides of the liquid storage portion, the spacing may be about the width of the liquid storage portion. The spacing between the first electrode and the second electrode may range from about 1 μm to about 1 mm, range from about 1 μm to about 500 μm, or range from about 10 μm to about 100 μm.

The second electrode may substantially follow the path of the first electrode. This may enable the spacing between the first and second electrodes to remain consistent along the length of the first and second electrodes. The second electrode may be arranged substantially parallel to the first electrode.

The first electrode and the second electrode may be interdigitated. The first electrode may comprise a plurality of protrusions and interspaces and the second electrode may comprise a plurality of protrusions and interspaces. The protrusions of the first electrode may extend into the interspaces of the second electrode and the protrusions of the second electrode may extend into the interspaces of the first electrode. Interdigitating the electrodes may minimise the spacing between the electrodes. This may improve the sensitivity of the measurements.

The protrusions of the first and second electrodes may be substantially linear. The protrusions of the first electrode may extend substantially in a first direction and the protrusions of the second electrode may extend substantially in a second direction. The first and second electrodes may be arranged with the first direction substantially parallel to the second direction. The protrusions may be substantially non-linear. The protrusions may be curved or arcuate. For example, a suitable sensor comprising interdigitated electrodes may be of the type DRP-G-IDEPT10 from DropSens™.

The aerosol-generating system may comprise aerosol-generator comprising one or more aerosol-generating elements. The one or more aerosol-generating elements may comprise one or more heating elements. The one or more aerosol-generating elements may comprise one or more vibratable elements. Where the aerosol-generator comprises one or more aerosol-generating elements, at least one of the aerosol-generating elements may comprise one of the electrodes. Forming one of the electrodes as part of the aerosol-generator may reduce the number of components required to manufacture the aerosol-generating system.

The control system may comprise electric circuitry. The electric circuitry may comprise a microprocessor, which may be a programmable microprocessor. The electric circuitry may comprise further electronic components. The electric circuitry may be configured to regulate a supply of power to the first electrode and the second electrode.

The control system may be configured to control or regulate a supply of power to the first electrode and the second electrode. The control system may be configured to control or regulate a supply of power to the aerosol-generator. A first control system may be configured to control or regulate the supply of power to the first electrode and the second electrode and a second control system may be configured to control or regulate the supply of power to the aerosol-generator.

Power may be supplied substantially continuously to the first electrode and the second electrode. Power may be supplied to the first electrode and the second electrode following activation of the system. Power may be supplied to the first electrode and the second electrode in the form of pulses of electrical current. Power may be supplied to the first electrode and the second electrode intermittently, such as on a puff-by-puff basis.

The control system may be configured to supply an oscillating measurement signal to the first electrode and the second electrode. In other words, the control system may be configured to supply an alternating voltage to the first and second electrodes. The control system may be configured to supply an oscillating measurement signal to the first electrode and the second electrode at a desired (or, alternatively a predetermined) frequency. The desired (or, alternatively a predetermined) frequency may be any suitable frequency for the control system to measure the electrical quantity between the first electrode and the second electrode. The desired (or, alternatively a predetermined) frequency may be equal to or less than about 20 MHz, or equal to or less than about 10 MHz. The desired (or, alternatively a predetermined) frequency may range from about 10 KHz to about 10 MHz, or range from about 10 KHz to about 1 MHz, or range from about 100 kHz to about 1 MHz.

The control system may be configured to determine the amount of liquid aerosol-forming substrate held in the liquid storage portion when the aerosol-generating system is switched on. The control system may be configured to determine the amount of liquid aerosol-forming substrate held in the liquid storage portion periodically at desired (or, alternatively a predetermined) intervals. The control system may be configured to determine the amount of liquid aerosol-forming substrate held in the liquid storage portion when prompted by an adult vaper.

The aerosol-generating system may comprise a power supply. The aerosol-generating system may comprise a power supply arranged to supply power to the control system, the first electrode and the second electrode and the aerosol-generator. The aerosol-generator may comprise a single power supply. The aerosol-generator may comprise a first power supply arranged to supply power to the first electrode and the second electrode and a second power supply configured to supply power to the aerosol-generator.

Liquid aerosol-forming substrates may comprise different compositions with different electrical properties. The control system may be configured to identify the liquid aerosol-forming substrate held in the liquid storage portion. The control system may be configured to adjust the determination of the amount of liquid aerosol-forming substrate held in the liquid storage portion based on the determined identity. In other words, the control system may be configured to compensate for the composition of the liquid aerosol-forming substrate held in the liquid storage portion.

The control system may comprise any suitable means for measuring the electrical quantity between the first electrode and the second electrode. In at least one example embodiment, the control system may comprise a bridge circuit configured to measure the electrical quantity between the first electrode and the second electrode. The bridge circuit may be any suitable bridge circuit known in the art, such as a Wheatstone bridge or a Wien bridge. The control system may comprise an LCR meter.

The electrical quantity to be measured by the control system may be impedance. The impedance between the first electrode and the second electrode may depend on the amount of liquid aerosol-forming substrate held in the liquid storage portion.

The impedance may be measured directly by the control system. The impedance may be calculated. For example, the impedance may be calculated from measurements of the magnitude of the voltage and the current between the electrodes, and measurements of the phase difference between the current and voltage. The amount of liquid aerosol-forming substrate held in the liquid storage portion may be calculated from the measured or calculated impedance.

The electrical quantity to be measured by the control system may be resistance. The resistance between the first electrode and the second electrode may depend on the amount of liquid aerosol-forming substrate held in the liquid storage portion. In at least one example embodiment, the resistance may increase as the amount of liquid aerosol-forming substrate held in the liquid storage portion decreases. The resistivity between the first electrode and the second electrode may depend on the amount of liquid aerosol-forming substrate held in the liquid storage portion.

The portion of the liquid storage portion arranged between the first and second electrodes may comprise a resistive load.

The resistance may be measured when the liquid aerosol-forming substrate comprises conductive materials.

The resistance may be calculated. In at least one example embodiment, the resistance may be calculated from measurements of the magnitude of the voltage and the current between the electrodes and the phase difference between the voltage and the current. The resistance may be calculated from measurements of the impedance. The amount of liquid aerosol-forming substrate held in the liquid storage portion may be calculated from the measured or calculated resistance.

The electrical quantity to be measured by the control system may be capacitance when the aerosol-forming substrate comprises dielectric materials.

The capacitance between the first electrode and the second electrode may depend on the amount of liquid aerosol-forming substrate held in the liquid storage portion. In at least one example embodiment, the capacitance may decrease as the amount of liquid aerosol-forming substrate held in the liquid storage portion decreases. The permittivity between the first electrode and the second electrode may depend on the amount of liquid aerosol-forming substrate held in the liquid storage portion. The portion of the liquid storage portion arranged between the first and second electrodes may comprise a capacitive load. The first electrode and the second electrode may form a capacitor. The first electrode may form a first capacitor plate and the second electrode may form a second capacitor plate. Liquid aerosol-forming substrate held in the liquid storage portion may form part of the dielectric of the capacitor. The capacitive load between the first electrode and the second electrode may have a capacitance in the picofarad (pF) range. This may enable fast charging and discharging times of the capacitor, and enable fast measurements of the capacitance.

The capacitance may be measured. In at least one example embodiment, the control system may comprise a charge measuring device configured to measure charge and discharge times of the capacitor comprising the first and second electrodes. The control system may comprise a timer circuit, such as a 555 timer circuit, and may be configured to determine capacitance based on the frequency of the timer circuit output.

The capacitance may be calculated. In at least one example embodiment, the capacitance may be calculated from measurements of the magnitude of the voltage and the current and the phase difference between the voltage and the current. The capacitance may be calculated from measurements of the impedance. The amount of liquid aerosol-forming substrate held in the liquid storage portion may be calculated from the measured or calculated capacitance.

The electrical quantity to be measured by the control system may depend on the size of the first and second electrodes and on the separation between the first and second electrodes. In at least one example embodiment, capacitance is a function of the separation between the first and second capacitor plates and the shape and size of the first and second capacitor plates. To ensure that a change in the electrical quantity being measured is not the result of a change in the shape or separation of the first and second electrodes, the first and second electrodes may be rigid and secured to a rigid platform or housing. The capacitor plates may comprise solid metal plates or thin walled metal sheets attached to a supporting substrate. The supporting substrate may be arranged between the capacitor plates to form part of the dielectric between the capacitor plates. The substrate may be arranged on the outside of the capacitor plates.

The aerosol-generating system may further comprise a reference sensor comprising a first and second reference electrodes arranged such that a portion of the liquid storage portion is arranged between the first and second reference electrodes. The liquid storage portion may be configured to maintain a constant amount of liquid aerosol-forming substrate at the reference sensor. The amount of liquid aerosol-forming substrate held in the liquid storage portion may be determined relative to measurements of the electrical quantity measured across the reference sensor.

The liquid storage portion may be any suitable shape and size. In at least one example embodiment, the liquid storage portion may be substantially cylindrical. The cross-section of the liquid storage portion may, for example, be substantially circular, elliptical, square or rectangular.

The liquid storage portion may comprise a housing. The housing may comprise a base and one or more sidewalls extending from the base. The base and the one or more sidewalls may be integrally formed. The base and one or more sidewalls may be distinct elements that are attached or secured to each other. The housing may be a rigid housing. As used herein, the term 'rigid housing' is used to mean a housing that is self-supporting. The rigid housing of the liquid storage portion may provide mechanical support to the aerosol-generator. The liquid storage portion may comprise one or more flexible walls. The flexible walls may be configured to adapt to the volume of the liquid aerosol-forming substrate held in the liquid storage portion. The housing of the liquid storage portion may comprise any suitable material. The liquid storage portion may comprise substantially fluid impermeable material. The housing of the liquid storage portion may comprise a transparent or a translucent portion, such that liquid aerosol-forming substrate held in the liquid storage portion may be visible to an adult vaper through the housing.

The liquid storage portion may be configured such that aerosol-forming substrate held in the liquid storage portion is protected from ambient air. The liquid storage portion may be configured such that aerosol-forming substrate stored in the liquid storage portion is protected from light. This may reduce the risk of degradation of the substrate and may maintain a high level of hygiene.

The liquid storage portion may be substantially sealed. The liquid storage portion may comprise one or more outlets for liquid aerosol-forming substrate held in the liquid storage portion to flow from the liquid storage portion to the aerosol-generator. The liquid storage portion may comprise one or more semi-open inlets. This may enable ambient air to enter the liquid storage portion. The one or more semi-open inlets may be semi-permeable membranes or one way valves, permeable to allow ambient air into the liquid storage portion and impermeable to substantially prevent air and liquid inside the liquid storage portion from leaving the liquid storage portion. The one or more semi-open inlets may enable air to pass into the liquid storage portion under specific conditions.

The liquid storage portion may comprise at least one channel configured to liquid aerosol-forming substrate. The at least one channel may be configured such that capillary forces act on the liquid aerosol-forming substrate. The capillary force acting on the liquid aerosol-forming substrate may hold the level of the liquid aerosol-forming substrate substantially perpendicular to at least one of the sidewalls of the liquid storage portion and the first and second electrodes. One dimension of the channel may be less than a desired (or, alternatively a predetermined) value, such that capillary forces act on liquid aerosol-forming substrate held in the channel. The dimension of the one or more channels may be the width of the one or more channel. The desired (or, alternatively a predetermined) value may be below about 3 mm, below about 2 mm, below about 0.5 mm, or below about 0.25 mm.

The liquid storage portion may comprise aerosol-forming substrate held in the liquid storage portion. As used herein with reference to at least one example embodiment, an aerosol-forming substrate is a substrate capable of releasing volatile compounds that can form an aerosol. Volatile compounds may be released by heating the aerosol-forming substrate. Volatile compounds may be released by moving the aerosol-forming substrate through passages of a vibratable element.

The aerosol-forming substrate may be liquid. The aerosol-forming substrate may be liquid at room temperature. The liquid aerosol-forming substrate may comprise both liquid and solid components. The aerosol-forming substrate may comprise nicotine. The nicotine containing liquid aerosol-forming substrate may be a nicotine salt matrix. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may comprise homogenized tobacco material. The aerosol-forming substrate may comprise a non-tobacco-containing material. The aerosol-forming substrate may comprise homogenized plant-based material.

The liquid aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavorants.

The liquid aerosol-forming substrate may comprise water, solvents, ethanol, plant extracts and natural or artificial flavors. The liquid aerosol-forming substrate may comprise one or more aerosol formers. Examples of suitable aerosol formers include glycerine and propylene glycol.

The liquid aerosol-forming substrate may comprise nicotine and at least one aerosol former. The aerosol former may be glycerine. The aerosol-former may be propylene glycol. The aerosol former may comprise both glycerine and propylene glycol. The liquid aerosol-forming substrate may have a nicotine concentration ranging from about 0.5% to about 10%. In at least one example embodiment, the liquid aerosol-forming substrate may have a nicotine concentration of about 2%.

The liquid aerosol-forming substrate may contain a mixture of dielectric materials, each with a separate dielectric constant (k). The main constituents of a liquid aerosol-forming substrate at room temperature, about 20 °C, may include, for example, glycerine (k~42), propylene glycol (k~32), water (k~80), air (k~1), nicotine and flavorants. Where the liquid aerosol-forming substrate forms a dielectric material, the electrical quantity to be measured by the control system may be capacitance.

The liquid aerosol-forming substrate may comprise a mixture of electrically conductive materials. Where the liquid aerosol-forming substrate forms an electrically conductive material, the electrical quantity to be measured by the control system may be resistance.

The liquid storage portion may comprise a carrier material within the housing configured to hold the liquid aerosol-forming substrate. The liquid aerosol-forming substrate may be adsorbed or otherwise loaded onto the carrier material. Liquid aerosol-forming substrate absorbed in the material may spread or permeate through the carrier material, and changes in the saturation of the carrier material affect the entire body of carrier material. This may enable first and second electrodes arranged in contact with a portion of the carrier material to sense changes in the electrical quantity of the entire body of carrier material. This may enable the control system to measure the electrical quantity of the entire liquid storage portion.

The carrier material may be made from any suitable absorbent body of material, for example, a foamed metal or plastics material, polypropylene, terylene, nylon fibres or ceramic. The aerosol-forming substrate may be retained in the carrier material prior to vaping of the aerosol-generating system. The aerosol-forming substrate may be released into the carrier material during vaping. The aerosol-forming substrate may be released into the carrier material immediately prior to use. In at least one example embodiment, the liquid aerosol-forming substrate may be provided in a capsule. The shell of the capsule may melt upon heating by the heater and releases the liquid aerosol-forming substrate into the carrier material. The capsule may contain a solid in combination with the liquid.

The liquid aerosol-forming substrate may be held in a capillary material. A capillary material is a material that actively conveys liquid from one end of the material to another. The capillary material may draw liquid aerosol-forming substrate to a specific location in the liquid storage portion, regardless of the orientation of the liquid storage portion. This may facilitate arrangement of the first and second electrodes for accurate and reliable determination of the amount of liquid aerosol-forming substrate held in the liquid storage portion.

The capillary material may be configured to convey the aerosol-forming substrate to the aerosol-generator. The capillary material may be configured to convey the aerosol-forming substrate to the first and second electrodes. The capillary material may have a fibrous structure. The capillary material may have a spongy structure. The capillary material may comprise a bundle of capillaries. The capillary material may comprise a plurality of fibers. The capillary material may comprise a plurality of threads. The capillary material may comprise fine bore tubes. The fibers, threads or fine-bore tubes may be generally aligned to convey liquid to an atomiser. The capillary material may comprise a combination of fibers, threads and fine-bore tubes. The capillary material may comprise sponge-like material. The capillary material may comprise foam-like material. The structure of the capillary material may form a plurality of small bores or tubes, through which the liquid can be transported by capillary action.

The capillary material may comprise any suitable material or combination of materials. Examples of suitable materials are a sponge or foam material, ceramic- or graphite-based materials in the form of fibers or sintered powders, foamed metal or plastics materials, a fibrous material, for example made of spun or extruded fibers, such as cellulose acetate, polyester, or bonded polyolefin, polyethylene, terylene or polypropylene fibers, nylon fibers or ceramic. The capillary material may have any suitable capillarity and porosity so as to be used with different liquid physical properties. The liquid aerosol-forming substrate has physical properties, including but not limited to viscosity, surface tension, density, thermal conductivity, boiling point and vapor pressure, which allow the liquid to be transported through the capillary material by capillary action.

The aerosol-generator may be arranged to receive aerosol-forming substrate from the liquid storage portion. The aerosol-generator may be an atomizer. The aerosol-generator may comprise one or more aerosol-generating elements. The aerosol-generator may be configured to vaporize received aerosol-forming substrate using heat. The aerosol-generator may comprise a heating element configured to vaporize received liquid aerosol-forming substrate. The one or more aerosol-generating elements may be heating elements. The aerosol-generator may be configured to atomize received aerosol-forming substrate using ultrasonic vibrations. The aerosol-generator may comprise an ultrasonic transducer. The one or more aerosol-generating elements may comprise one or more vibratable elements.

The aerosol-generator may comprise at least one heating element configured to heat the aerosol-forming substrate. The heating element may comprise one or more heating elements. The one or more heating elements may be configured to most effectively heat received aerosol-forming substrate. The one or more heating elements may be configured to heat the aerosol-forming substrate primarily by means of conduction. The one or more heating elements may be arranged substantially in directly contact with the aerosol-forming substrate. The one or more heating elements may be configured to transfer heat to the aerosol-forming substrate via one or more heat conductive elements. The one or more heating elements may be configured to transfer heat to ambient air drawn through the aerosol-generating system during use, which may heat the aerosol-forming substrate by convection. The one or more heating elements may be configured to heat the ambient air before it is drawn through the aerosol-forming substrate. The one or more heating elements may be configured to heat the ambient air after it is drawn through the aerosol-forming substrate.

The heating element may be an electric heater. The electric heater may comprise one or more electric heating elements. The one or more electric heating elements may comprise an electrically resistive material. Suitable electrically resistive materials may include: semiconductors such as doped ceramics, electrically "conductive" ceramics (such as, for example, molybdenum disilicide), carbon, graphite, metals, metal alloys and composite materials made of a ceramic material and a metallic material.

The one or more electric heating elements may take any suitable form. In at least one example embodiment, the one or more electric heating elements may take the form of one or more heating blades. The one or more electric heating elements may take the form of a casing or substrate having different electro-conductive portions, or one or more electrically resistive metallic tube.

The liquid storage portion may incorporate one or more disposable heating elements. The one or more electric heating elements may comprise one or more heating needles or rods that run through the aerosol-forming substrate. The one or more electric heating elements may comprise one or more flexible sheets of material. The electric heating element may comprise one or more heating wires or filaments, for example nickel-chromium (Ni—Cr), platinum, tungsten or alloy wires, or heating plates. The one or more heating elements may be deposited in or on a rigid carrier material.

The one or more heating elements may comprise one or more heat sinks or heat reservoirs. The one or more heat sinks or heat reservoirs may comprise a material configured to absorb and/or store heat and subsequently releasing the heat over time to heat the aerosol-forming substrate.

The heating element may be substantially flat to allow for straightforward manufacture. As used herein, the term 'substantially flat' means formed in a single plane and not wrapped around or otherwise confirmed to fit a curved or other non-planar shape. A flat heating element may be easily handled during manufacture and provide for a robust construction.

The heating element may be of the type described in EP-B1-2493342, the entire content of which is incorporated herein by reference thereto. In at least one example embodiment, the heating element may comprise one or more electrically conductive tracks on an electrically insulating substrate. The electrically insulating substrate may comprise any suitable material, and may be a material that is able to tolerate high temperatures (in excess of 300 °C) and rapid temperature changes. An example of a suitable material is a polyimide film, such as Kapton®.

The heating elements may be configured to heat a small amount of liquid aerosol-forming substrate at a time. The heating element may include, for example, a liquid passageway in communication with the liquid aerosol-forming substrate. The liquid aerosol-forming substrate may be forced into the liquid passageway by capillary force. The at least one heater may be arranged such that during vaping, only the small amount of liquid aerosol-forming substrate within the liquid passageway, and not the liquid within the housing, is heated. The heating element may comprise a coil substantially surrounding at least a portion of a liquid passageway.

The heating element may comprise an inductive heating element. Inductive heating elements are described in more detail below, in relation to the cartridge.

The aerosol-generator may comprise one or more vibratable elements and one or more actuators configured to excite vibrations in the one or more vibratable elements. The one or more vibratable elements may comprise a plurality of passages through which aerosol-forming substrate may pass and become atomized. The one or more actuators may comprise one or more piezoelectric transducers.

The aerosol-generator may comprise one or more capillary wicks for conveying liquid aerosol-forming substrate held in the liquid storage portion to the one or more elements of the aerosol-generator. The liquid aerosol-forming substrate may have physical properties, including viscosity, which allow the liquid to be transported through the one or more capillary wicks by capillary action. The one or more capillary wicks may have any of the properties of structures described above relating to the capillary material.

The one or more capillary wicks may be arranged to contact liquid held in the liquid storage portion. The one or more capillary wicks may extend into the liquid storage portion. In this case, during vaping, liquid may be transferred from the liquid storage portion to the one or more elements of the aerosol-generator by capillary action in the one or more capillary wicks. The one or more capillary wicks may have a first end and a second end. The first end may extend into the liquid storage portion to draw liquid aerosol-forming substrate held in the liquid storage portion into the aerosol generator. The second end may extend into an air passage of the aerosol-generating system. The second end may comprise one or more aerosol-generating elements. The first end and the second end may extend into the liquid storage portion. One or more aerosol-generating elements may be arranged at a central portion of the wick between the first and second ends. During vaping, when the one or more aerosol-generating elements are activated, the liquid aerosol-forming substrate in the one or more capillary wicks is atomized and/or vaporized at and around the one or more aerosol-generating elements. Atomized and/or vaporized aerosol-forming substrate may be mixed with and carried in air flow through an air passage of the aerosol-generating system.

The aerosol-generator may comprise one or more heating wires or filaments encircling a portion of one or more capillary wicks. The heating wire or filament may support the encircled portion of the one or more capillary wicks.

When there is sufficient liquid aerosol-forming substrate held in the liquid storage portion, the one or more capillary wicks may be wet with liquid aerosol-forming substrate. In other words, a wet capillary wick may comprise predominantly capillary material and liquid aerosol-forming substrate. When there is not sufficient liquid aerosol-forming substrate held in the liquid storage portion, the one or more capillary wicks may be dry. In other words, a dry capillary wick may comprise predominantly capillary material and air. A wet capillary wick may have different electrical properties than a dry capillary wick.

The capillary properties of the one or more capillary wicks, combined with the properties of the liquid substrate, may ensure that, during normal vaping when there is sufficient aerosol-forming substrate, the wick is always wet with liquid aerosol-forming substrate in the area of the aerosol-generator. When the one or more capillary wicks are dry, the one or more capillary wicks may not deliver a regular supply of liquid aerosol-forming substrate to the aerosol-generator. Activation of the aerosol-generator when the one or more capillary wicks are dry may result in the generation of undesirable constituents by the aerosol-generator.

At least a portion of the one or more capillary wicks may be arranged between the first electrode and the second electrode. The first electrode and the second electrode may be arranged to sense an electrical quantity of the one or more capillary wicks. The control system may be configured to determine whether the one or more capillary wicks are wet with liquid aerosol-forming substrate or whether the one or more capillary wicks are dry based on the measured electrical quantity information. The control system may be further configured to substantially prevent and/or reduce operation of the aerosol-generator if the one or more capillary wicks are determined to be dry. This may substantially prevent and/or reduce the generation of undesirable constituents on activation of the aerosol-generator when the one or more capillary wicks are dry.

The aerosol-generating system may comprise one or more power supplies. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy for vaping. In at least one example embodiment, the power supply may have sufficient capacity to allow for the substantially continuous generation of aerosol for a period of around six minutes, corresponding to the typical time taken to smoke a cigarette, or for a period that is a multiple of six minutes. In another example embodiment, the power supply may have sufficient capacity to allow for a desired (or, alternatively a desired (or, alternatively a predetermined)) number of puffs or discrete activations of the heating element and actuator.

The aerosol-generating system may comprise a control system configured to operate the aerosol-generator. The control system configured to operate the aerosol-generator may be the control system configured to determine the amount of liquid aerosol-forming substrate held in the liquid storage portion. The control system configured to operate the aerosol-generator may be distinct of the control system configured to determine the amount of liquid aerosol-forming substrate held in the liquid storage portion. The control system configured to operate the aerosol-generator may comprise similar components to the control system configured to determine the amount of liquid held in the liquid storage portion.

The aerosol-generating system may comprise a temperature sensor in communication with the control system. The temperature sensor may be adjacent to the liquid storage portion. The temperature sensor may be a thermocouple. At least one element of the aerosol-generator may be used by the control system to provide information relating to the temperature. The temperature dependent resistive properties of the at least one element may be known and used to determine the temperature of the at least one element in a manner known to the skilled person. The control system may be configured to account for the effect of temperature on the electrical load of the liquid storage portion using measurements of temperature from the temperature sensor. In at least one example embodiment, where the portion of the liquid storage portion arranged between the first and second electrodes comprises a capacitive load, the control system may be configured to account for variations in the dielectric properties of the liquid storage portion due to changes in temperature.

The aerosol-generating system may comprise a puff detector in communication with the control electronics. The puff detector may be configured to detect when an adult vaper draws on the mouthpiece. The control electronics may be configured to control power to the aerosol-generator in dependence on the input from the puff detector.

The control system may comprise a tilt sensor. The tilt sensor may be configured to sense the orientation of the liquid storage portion. The aerosol-generating system may comprise a control system configured to receive sensed orientation information from the tilt sensor and to determine the orientation of the liquid storage portion. By determining the orientation of the liquid storage portion, the control system may be configured to determine whether the liquid aerosol-forming substrate held in the liquid storage portion is substantially perpendicular to the first and second electrodes. The control system may be configured to determine the amount of liquid aerosol-forming substrate held in the liquid storage portion when the liquid aerosol-forming substrate held in the liquid storage portion is substantially perpendicular to the first and second electrodes, such as when the liquid storage portion is determined to be upright.

The liquid aerosol-forming substrate may be subject to gravitational and acceleration forces that move the liquid aerosol-forming substrate to different sections of the liquid storage portion. Provided that the entire liquid storage portion is arranged between the first and second electrodes, the measurement of the electrical quantity should not be affected.

The aerosol-generating system may comprise an input, such as a switch or button. This enables the adult vaper to turn the system on. The switch or button may activate the aerosol-generator. The switch or button may initiate aerosol generation. The switch or button may prepare the control electronics to await input from the puff detector.

The aerosol-generating system may comprise an indicator, for indicating the determined amount of liquid aerosol-forming substrate to an adult vaper. The indicator may comprise one or more of lights, such as light emitting diodes (LEDs), a display, such as an LCD display, and a loudspeaker or buzzer. The control system may be configured to indicate the determined amount of liquid aerosol-forming substrate to an adult vaper with the indicator. The control system may be configured to light one or more of the lights, display an amount of the display or emit sounds via the loudspeaker or buzzer.

The aerosol-generating system may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The housing may comprise a cavity for receiving the power supply. The housing may comprise a mouthpiece. The mouthpiece may comprise at least one air inlet and at least one air outlet. The mouthpiece may comprise more than one air inlet. One or more of the air inlets may reduce the temperature of the aerosol before it is delivered to an adult vaper and may reduce the concentration of the aerosol before it is delivered to an adult vaper.

The aerosol-generating system may be portable. The aerosol-generating system may have a size comparable to a cigar or a cigarette. The aerosol-generating system may have a total length ranging from about 30 mm to about 150 mm. The aerosol-generating system may have an external diameter ranging from about 5 mm to about 30 mm.

The aerosol generating system may be an electrically operated vaping system. The aerosol-generating system may be an electronic cigarette or an electronic cigar.

The aerosol-generating system may comprise a main unit and a cartridge. The main unit comprises the control system. The cartridge comprises the liquid storage portion for holding the liquid aerosol-forming substrate. The main unit may be configured to removably receive the cartridge. The first electrode and the second electrode may be arranged such that a portion of the liquid storage portion of the cartridge is between the first electrode and the second electrode when the cartridge is received by the main unit.

The main unit may comprise one or more power supplies. The main unit may comprise the aerosol-generator.

The cartridge may comprise the aerosol-generator. Where the cartridge comprises the aerosol-generator, the cartridge may be referred to as a 'cartomizer'.

The aerosol-generating system may comprise an aerosol-generating component comprising the aerosol-generator. The aerosol-generating component may be separate of the main unit and the cartridge. The aerosol-generating component may be removably receivable by at least one of the main unit and the cartridge.

The main unit may comprise the first electrode and the second electrode. The cartridge may comprise the first electrode and the second electrode. The main unit may comprise one of the first electrode and the second electrode. The cartridge may comprise one of the first electrode and the second electrode. Arranging one of the first electrode and the second electrode on the main unit and arranging the other of the first electrode and the second electrode on the cartridge may enable identification of the cartridge. In other words, the presence or absence of an electrode on the cartridge may be used to verify whether the cartridge received by the main unit is a genuine or authentic cartridge from the manufacturer of the main unit. The type of electrode or measurements between the electrode of the main unit and the electrode of the cartridge may also be used to identify the type of cartridge received by the main unit or the type of liquid aerosol-forming substrate held in the liquid storage portion of the cartridge. The control system may be configured to determine the presence or absence of an electrode in the cartridge. The control system may be configured to determine the identity the cartridge based on the presence or absence of an electrode in the cartridge. The control system may also be configured to determine whether the cartridge has been correctly received by the main unit based on the presence or absence of an electrode in the cartridge.

The aerosol-generator may comprise the heating element substantially as described above in relation to at least one example embodiment. The heating element may be an inductive heating element, such that no electrical contacts are formed between the cartridge and the main unit. The main unit may comprise an inductor coil and a power supply configured to provide high frequency oscillating current to the inductor coil. The cartridge may comprise a susceptor element positioned to heat the aerosol-forming substrate. As used herein, a high frequency oscillating current means an oscillating current having a frequency ranging from about 10 KHz to about 20 MHz.

The cartridge may be removably coupled to the main unit. The cartridge may be removed from the main unit when the aerosol-forming substrate has been consumed. The cartridge may be disposable. However, the cartridge may be reusable and the cartridge may be refillable with liquid aerosol-forming substrate. The cartridge may be replaceable in the main unit. The main unit may be reusable.

The cartridge may be manufactured at low cost, in a reliable and repeatable fashion. As used herein, the term 'removably coupled' means that the cartridge and the main unit can be coupled and uncoupled from one another without significantly damaging either the main unit or the cartridge.

The cartridge may have a simple design. The cartridge may have a housing within which a liquid aerosol-forming substrate is held. The cartridge housing may be a rigid housing. The housing may comprise a material that is impermeable to liquid.

The cartridge may comprise a lid. The lid may be peelable before coupling the cartridge to the main unit. The lid may be piercable.

The main unit may comprise a cavity for receiving the cartridge. The main unit may comprise a cavity for receiving the power supply.

The main unit may comprise the aerosol-generator. The main unit may comprise one or more control systems of the aerosol-generating system. The main unit may comprise the power supply. The power supply may be removably coupled to the main unit.

The main unit may comprise the mouthpiece. The mouthpiece may comprise at least one air inlet and at least one air outlet. The mouthpiece may comprise more than one air inlet.

The main unit may comprise a piercing element for piercing the lid of the cartridge. The mouthpiece may comprise the piercing element. The mouthpiece may comprise at least one first conduit extending between the at least one air inlet and a distal end of the piercing element. The mouthpiece may comprise at least one second conduit extending between a distal end of the piercing element and the at least one air outlet. The mouthpiece may be arranged such that during vaping, when an adult vaper draws on the mouthpiece, air flows along an air passage extending from the at least one air inlet, through the at least one first conduit, through a portion of the cartridge, through the at least one second conduit and exits the at least one outlet. This may improve airflow through the main unit and enable the aerosol to be delivered to the adult vaper more easily.

During vaping, an adult vaper may insert a cartridge as described herein into the cavity of a main unit as described herein. The adult vaper may attach the mouthpiece to the body of the main unit, which may pierce the cartridge with the piercing portion. The adult vaper may activate the main unit by pressing the switch or the button. The adult vaper may draw on the mouthpiece to draw air into the main unit through the one or more air inlets. The air may pass over a portion of the aerosol-generator, entraining atomized aerosol-forming substrate, and exit the main unit through the air outlet in the mouthpiece to be inhaled by the adult vaper.

A kit of parts may be provided, comprising a cartridge and a main unit, substantially as described above. An aerosol-generating system according to at least one example embodiment may be provided by assembling the cartridge, the aerosol-generator and the main unit. The components of the kit of parts may be removably connected. The components of the kit of parts may be interchangeable. Components of the kit of parts may be disposable. Components of the kit of parts may be reusable.

In at least one example embodiment, there is provided a main unit for an aerosol-generating system. The main unit comprises the control system; and at least one of the first electrode and the second electrode.

According to at least one example embodiment, there is provided a cartridge for an aerosol-generating system. The cartridge comprises: the liquid storage portion; and at least one of the first electrode and the second electrode. The cartridge may comprise a housing for holding a liquid aerosol-forming substrate in the liquid storage portion. The cartridge may comprise aerosol-generator arranged to receive liquid aerosol-forming substrate from the liquid storage portion.

According to at least one example embodiment, a method of determining the amount of liquid aerosol-forming substrate held in a liquid-storage portion of an aerosol-generating system comprises: holding a liquid aerosol-forming substrate in a liquid storage portion of an aerosol-generating system; arranging at least a portion of the liquid storage portion between a first electrode and a second electrode; measuring an electrical quantity between the first electrode and the second electrode; and determining the amount of liquid aerosol-forming substrate held in the liquid storage portion based on the measured electrical quantity information.

Features such as the liquid storage portion and the first and second electrodes may be the same as those described in relation to the example embodiments described above.

The determining the amount of liquid aerosol-forming substrate held in the liquid storage portion may comprise comparing the measured electrical quantity information to reference electrical quantity information. The reference electrical quantity information may be electrical quantity information previously measured by the control system. The reference electrical quantity information may be stored in a memory of the aerosol-generating system. The reference electrical quantity information may be stored in a lookup table.

The reference electrical quantity information may be measured by the control system in a calibration procedure. The calibration procedure may be performed to populate the lookup table. In the calibration procedure, the liquid storage portion may be loaded with desired (or, alternatively a predetermined) amounts of liquid aerosol-forming substrate. The electrical quantity between the first electrode and the second electrode may be measured when the liquid storage portion is loaded with the known amounts of liquid aerosol-forming substrate. The measured electrical quantity information may be stored in a lookup table and associated in the lookup table with the known amount of liquid aerosol-forming substrate held in the liquid storage portion at the time of the measurement.

The calibration procedure may be performed in the factory before the aerosol-generating system is distributed. The calibration procedure may be performed by an adult vaper before vaping of the aerosol-generating system.

A method of preventing operation of aerosol-generator of an aerosol-generating system may comprise: holding a liquid aerosol-forming substrate in a liquid storage portion of an aerosol-generating system; arranging at least a portion of the liquid storage portion between a first electrode and a second electrode; measuring an electrical quantity between the first electrode and the second electrode; comparing the determined amount of liquid aerosol-forming substrate to a desired (or, alternatively a predetermined) threshold amount; and preventing operation of the aerosol-generator if the determined amount of liquid aerosol-forming substrate is below the desired (or, alternatively a predetermined) threshold amount. This may enable the aerosol-generating system to prevent or inhibit operation of aerosol-generator when the aerosol-generator is dry.

Features described in relation to example embodiment may also be applicable to other example embodiments. Features described in relation to the method may be applicable to the aerosol-generating system and features corresponding to the aerosol-generating system may be applicable to the method.

FIG. 1 is a schematic illustration of an aerosol-generating system according to at least one example embodiment.

FIG. 1 is schematic in nature, and the components shown are not necessarily to scale either individually or relative to one another. The aerosol-generating system comprises a main unit 100, which is reusable, in cooperation with a cartridge 200, which is disposable. The aerosol-generating system shown in FIG. 1 is an electrically operated vaping system.

The main unit 100 comprises a housing 101. The housing has a substantially cylindrical cross-section and has a longitudinal length of about 100 mm and an external diameter of about 20 mm, which is comparable to a cigar. The main unit 100 comprises an electric power supply in the form of a lithium ion phosphate battery 102 and a control system in the form of control electronics 104. The housing 101 also defines a cavity 112 into which the cartridge 200 is received.

The main unit 100 also includes a mouthpiece portion 120 including an outlet 124. The mouthpiece portion is connected to the main housing 101 by a hinged connection, but any kind of connection may be used, such as a snap fitting or a screw fitting. One or more air inlets 122 are provided between the mouthpiece portion 120 and the main body 101 when the mouthpiece portion is in a closed position, as shown in FIG. 1.

Within the mouthpiece portion is a flat spiral inductor coil 110. The coil 110 is formed by stamping or cutting a spiral coil from a sheet of copper. The coil 110 is positioned between the air inlets 122 and the air outlet 124 so that air drawn through the inlets 122 to the outlet 124 passes through the coil.

The cartridge 200 (shown in schematic form in FIG. 1) comprises a rigid housing 204 defining a liquid storage portion 201. The liquid storage portion 201 contains a liquid aerosol-forming substrate (not shown). The housing 204 of the cartridge 200 is fluid impermeable, but has an open end covered by a permeable susceptor element 210. The permeable susceptor element 210 comprises a ferrite mesh, comprising a ferrite steel. The aerosol-forming substrate can form a meniscus in the interstices of the mesh. When the cartridge 200 is engaged with the main unit and is received in the cavity 112, the susceptor element 210 is positioned adjacent the flat spiral coil 110. The cartridge 200 may include keying features to ensure that it cannot be inserted into the main unit upside-down.

During vaping, an adult vaper puffs on the mouthpiece portion 120 to draw air though the air inlets 122 into the mouthpiece portion 120 and out of the outlet 124 into the adult vaper's mouth. The main unit includes a puff sensor 106 in the form of a microphone, as part of the control electronics 104. A small air flow is drawn through sensor inlet 121 past the microphone 106 and up into the mouthpiece portion 120 when an adult vaper puffs on the mouthpiece portion. When a puff is detected, the control electronics provide a high frequency oscillating current to the coil 110. This generates an oscillating magnetic field as shown in dotted lines in FIG. 1. An LED 108 is also activated to indicate that the main unit is activated. The oscillating magnetic field passes through the susceptor element, inducing eddy currents in the susceptor element. The susceptor element heats up as a result of Joule heating and as a result of hysteresis losses, reaching a temperature sufficient to vaporize the aerosol-forming substrate close to the susceptor element. The vaporized aerosol-forming substrate is entrained in the air flowing from the air inlets to the air outlet and cools to form an aerosol within the mouthpiece portion before exiting the device. The control electronics supplies the oscillating current to the coil for a desired (or, alternatively a predetermined) duration, in this example five seconds, after detection of a puff and then switches the current off until a new puff is detected.

The cartridge 200 has a generally cylindrical cross-section, and the susceptor element spans a circular open end of the cartridge housing. It will be appreciated that other configurations are possible. In at least one example embodiment, the susceptor element may be a strip of steel mesh 220 that spans a rectangular opening in the cartridge housing 204.

The example aerosol-generating system shown in FIG. 1 relies on inductive heating. Further examples of suitable inductive heating elements and explanation of the operation of inductive heating systems are described in WO 2015/177046 A1, the entire content of which is incorporated herein by reference thereto.

It will be appreciated that the aerosol-generating system may comprise other types of aerosol-generator. In at least one example embodiment, the aerosol-generator may comprise other aerosol-generator configured to vaporize the liquid aerosol-forming substrate by heat. The aerosol-generator may comprise one or more resistive heating elements. The aerosol-generator may also comprise aerosol-generator configured to atomize the liquid aerosol-forming substrate by vibration. The aerosol-generator may comprise one or more vibratable elements and actuators.

Several examples of cartridges suitable for main units of aerosol-generating systems, such as the main unit shown in FIG. 1, are shown in FIGS. 2 to 12. The cartridges shown in FIGS. 2 to 12 comprise liquid storage portions and electrode arrangements according to at least one example embodiment.

Figure 2:
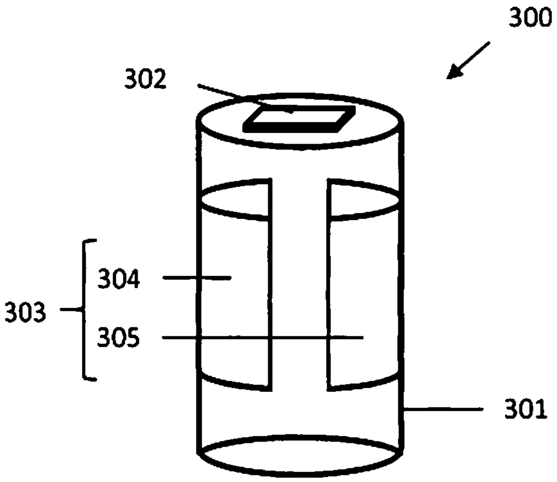
FIG. 2 is an illustration of a liquid storage portion for an aerosol-generating system according to at least one example embodiment.

The cartridge 300 shown in FIG. 2 comprises a substantially cylindrical housing 301, having a closed end and a substantially open end. The housing is rigid and substantially fluid impermeable, and defines a liquid storage portion that is configured to hold liquid aerosol-forming substrate (not shown) either freely or held in a carrier material. Aerosol-generating elements 302 are provided over the open end of the housing 301. In at least one example embodiment, the aerosol-generating elements comprise a ferrite mesh susceptor. A sensor 303 is arranged on an inner surface of the housing 301, within the liquid storage portion. The sensor comprises a first electrode 304 and a second electrode 305. The first and second electrodes 304, 305 are substantially identical and comprise arcuate metal plates arranged at opposite sides of housing 301. Each electrode 304, 305 circumscribes about half the circumference of the inner surface of the housing 301 and extends substantially the length of the housing 301, from the open end to the closed end. The electrodes 304, 305 are arranged on the housing with a gap between the sides of the plates, to ensure that the plates 304, 305 are not in an electrically conductive relationship. This arrangement enables the sensor 303 to sense electrical quantities of the entire liquid storage portion.

Electrical contacts (not shown) extend through the housing, from the outer surface to the inner surface of each of the plates. When the cartridge 300 is received in a cavity of a main unit, the contacts of the cartridge 300 abut complimentary contacts arranged in the cavity of the main unit to electrically connect the sensor 303 to a power supply and a control system of the main unit.

Figure 3:
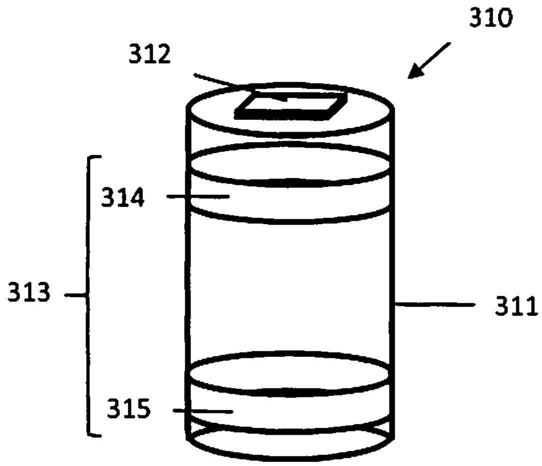
FIG. 3 is an illustration of a liquid storage portion for an aerosol-generating system according to at least one example embodiment.

The cartridge 310 shown in FIG. 3 has a substantially similar construction to the cartridge 300 shown in FIG. 2. The cartridge 310 comprises a substantially circularly cylindrical housing 311 defining a liquid storage portion, and an aerosol-generating element 312 arranged over an open end. The cartridge 300 comprises a sensor 313 arranged around at an outer surface of the liquid storage portion. The sensor 313 comprises a first electrode 314 and a second electrode 315. The first and second electrodes 314, 315 are substantially identical and comprise copper rings circumscribing the outer surface of the housing 311. The first electrode 314, 315 is arranged towards the open end of the housing 311 and the second electrode 315 is arranged towards the closed end so that the sensor 313 is configured to sense electrical quantities of the entire liquid storage portion.

Figure 4:
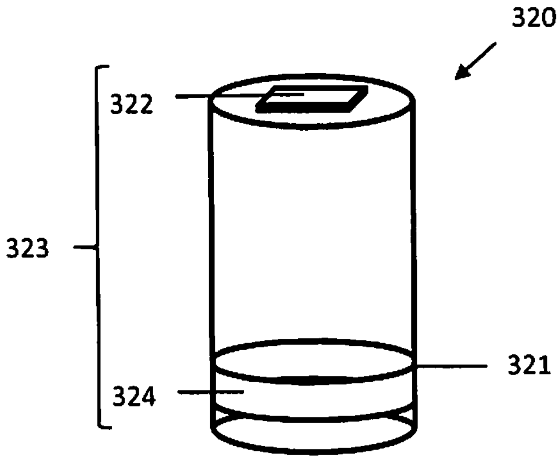
FIG. 4 is an illustration of a liquid storage portion for an aerosol-generating system according to at least one example embodiment.

The cartridge 320 shown in FIG. 4 has a substantially similar construction to the cartridge 310 shown in FIG. 3. The cartridge 320 comprises a substantially cylindrical housing 321, having an open end and a closed end, and an aerosol-generating element 322 arranged over the open end. The cartridge 320 comprises a sensor 323 comprising a first electrode 324 comprising a ring electrode arranged at an inner surface of the housing 321, and a second electrode comprising the aerosol-generating element 322.

Figure 5:
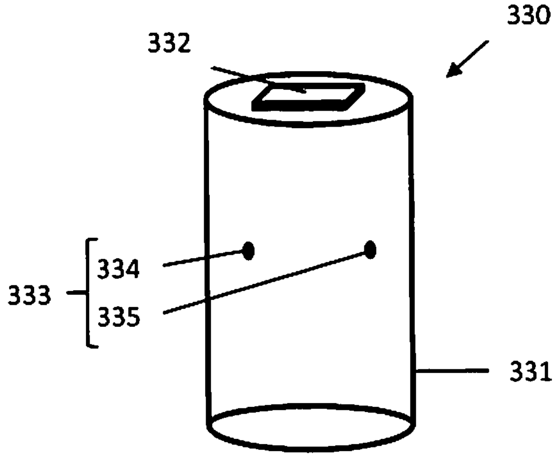
FIG. 5 is an illustration of a liquid storage portion for an aerosol-generating system according to at least one example embodiment.

The cartridge 330 shown in FIG. 5 has a substantially similar construction to the cartridges 300, 310 and 320 shown in FIGS. 2, 3 and 4. The cartridge 330 comprises a substantially cylindrical housing 331, having an open end and a closed end, and an aerosol-generating element 332 arranged over the open end. The cartridge 330 comprises a sensor 333 arranged at an inner surface of the housing 321. The sensor 333 comprises a first electrode 334 and a second electrode 335. The first and second electrodes 334, 335 are point electrodes extending through opposing sides of the housing 331 at the same position along the length of the housing 331. This minimizes and/or reduces the distance between the electrodes and may improve the sensitivity of the sensor 333. Where carrier material is provided in the liquid storage portion, the point electrodes 334, 335 may be arranged in contact with the carrier material. Liquid aerosol-forming substrate held in the liquid storage portion permeates through the carrier material. A change in the amount of liquid aerosol-forming substrate held in the liquid storage portion affects the saturation of the carrier material and changes electrical quantities of the carrier material. This enables the point electrodes 334, 335 to sense electrical quantities of the entire liquid storage portion.

Figure 6:
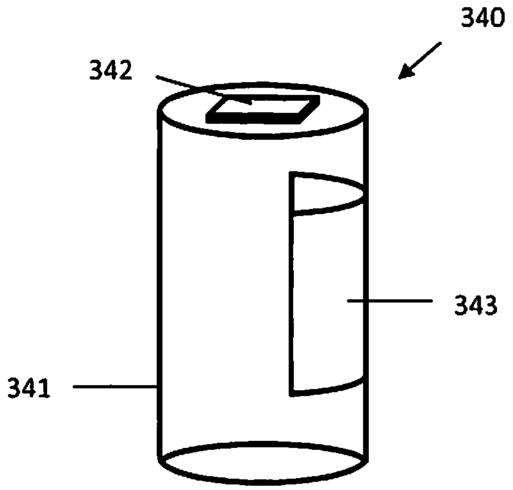
FIG. 6 is an illustration of a liquid storage portion for an aerosol-generating system according to at least one example embodiment.

The cartridge 340 shown in FIG. 6 has a substantially similar construction to the cartridges 300, 310, 320 and 330 shown in FIGS. 2, 3, 4 and 5. The cartridge 340 comprises a substantially cylindrical housing 341, having an open end and a closed end, and an aerosol-generating element 342 arranged over the open end. The cartridge 340 comprises a sensor 343 arranged at an inner surface of the housing 341. The sensor 343 comprises first and second electrodes (not shown) arranged on a platform. The platform comprises an electrically insulating polymer sheet, having a similar size and shape to one of the electrodes 304, 305 of the cartridge 300 shown in FIG. 2. The platform is adhered to the inner surface of the housing 343 and is sufficiently flexible to conform to the shape of the housing 343.

Figure 7:
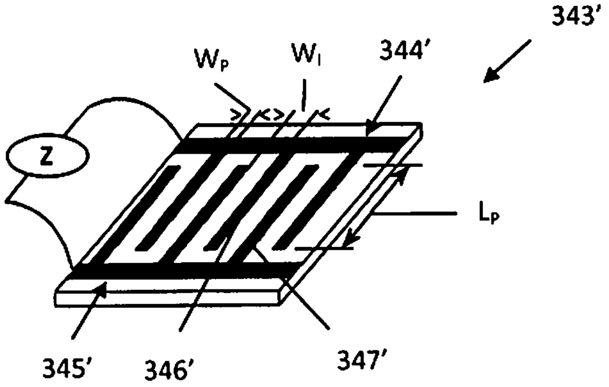
FIG. 7 is an illustration of a sensor comprising interdigitated electrodes according to at least one example embodiment.

In at least one example embodiment, first and second electrodes are arranged on a platform, such as the platform of the sensor 343, is shown in FIG. 7. The sensor 343' comprises a first electrode 344' and a second electrode 345' that are interdigitated. Each electrode 344', 345' is substantially identical and comprises a linear main track and a plurality of linear protrusions extending away from the main track, in a direction substantially perpendicular to the main track. Each electrode 344', 345' comprises about 125 protrusions, each protrusion having a length $L_P$, of about 6760 μm, and a width $W_P$, of about 10 μm. Neighbouring protrusions are spaced apart by interspaces having a width $W_I$, of about 30 μm.

The main track of the first electrode 344' and the main track of the second electrode 345' are arranged in parallel on the platform, at a separation of about 6780 μm. The first electrode 344' is arranged with its protrusions 346' facing the second electrode 345' and within the interspaces of the second electrode 345'. The second electrode 345' is arranged with its protrusions 347' facing the first electrode 344' and within the interspaces of the first electrode 344'. In this arrangement, a consistent spacing of about 10 μm is provided between the first electrode 344' and the second electrode 345' along the entire length of the electrodes 344', 345'.

Figure 8:
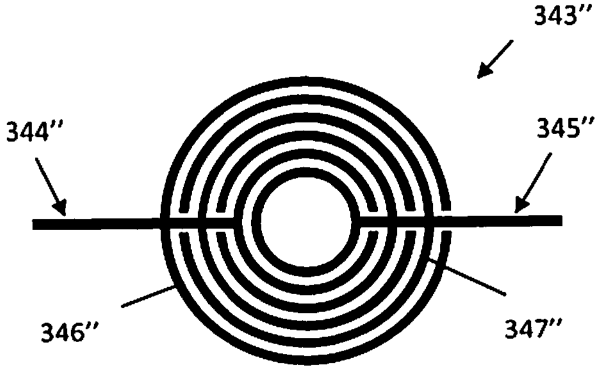
FIG. 8 is an illustration of a sensor comprising interdigitated electrodes according to at least one example embodiment.

In at least one example embodiment, the first and second electrodes are arranged on a platform, such as the platform of the sensor 343, is shown in FIG. 8. The sensor 343"

comprises a first electrode 344" and a second electrode 345" that are interdigitated. Each electrode 344", 345" comprises a linear main track and a plurality of pairs of arcuate protrusions, extending in opposite directions away from the main track. Each electrode 344", 345" comprises 50 pairs of arcuate protrusions. Each protrusion has a width of about 10 μm. Each pair of protrusions forms an incomplete circle that is not joined at the distalmost end from the main track. Neighbouring pairs of protrusions are spaced apart by interspaces having a width of about 30 μm. The distalmost protrusion of the second electrode 345" comprises a complete circle.

The main track of the first electrode 344" and the main track of the second electrode 345" are arranged in coaxial alignment on the platform parallel on the platform, with the protrusions 346" of the first electrode 344" within the interspaces of the second electrode 345" and the protrusions 347" of the second electrode 345" within the interspaces of the first electrode 344". The distalmost protrusion of the first electrode 344" substantially surrounds the distalmost protrusion of the second electrode 345". In this arrangement, a consistent spacing of about 10 μm is provided between the first electrode 344' and the second electrode 345' along the entire length of the electrodes 344', 345'.

Figure 9:
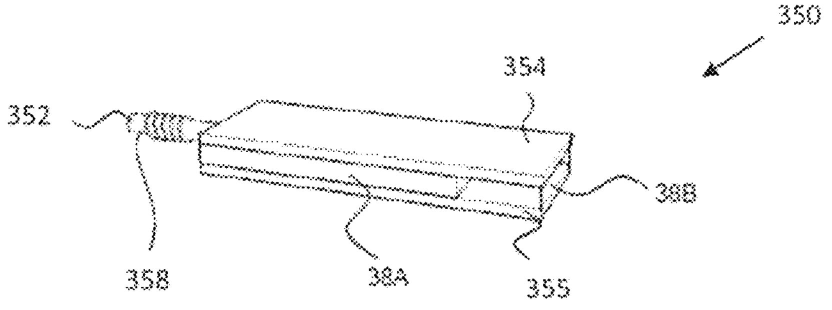
FIG. 9 is an illustration of a liquid storage portion for an aerosol-generating system according to at least one example embodiment.

The cartridge 350 shown in FIG. 9 comprises a rigid housing 351 defining a liquid storage portion. The housing 351 comprises substantially planar sides. The internal volume of the housing 301 is sufficiently narrow that capillary forces act on a liquid aerosol-forming substrate held in the liquid storage portion. A sensor 353 comprises a first plate electrode 354 and a second plate electrode 355 arranged at opposite sides of the liquid storage portion. The electrodes 354, 355 form substantially parallel electrode plates having a length ranging from about 25 mm to about 30 mm, and a width ranging from about 5 mm to about 7 mm. This corresponds to a surface area ranging from about 25 mm×5 mm to about 30 mm×7 mm. The separation between the first and second electrodes 344, 345 ranges from about 2 mm to about 3 mm.

The cartridge 350 further comprises an aerosol-generator in the form of a wick 352 extending from an end of the liquid storage portion and a heating coil 358 wound around the wick 352 at the distal end. During vaping, the coil 358 heats the wick 352 and vaporizes liquid aerosol-forming substrate in the wick 352. This draws liquid aerosol-forming substrate held in the liquid storage portion to the wick end of the liquid storage portion. The capillary forces caused by the narrow separation between the first and second electrodes 354, 355 do not enable the liquid aerosol-forming substrate held in the liquid storage portion to move freely. As a result, liquid aerosol-forming substrate collects at the wick end of the liquid storage portion and the liquid storage portion may be notionally divided into two sections, a first section 38A towards the wick end that is filled with liquid aerosol-forming substrate and a second section 38B opposite the wick end that is filled with air. As the liquid aerosol-forming substrate is consumed in use, the second section 38B filled with air increases in size and the first section 38A filled with liquid aerosol-forming substrate decreases in size.

Figure 10:
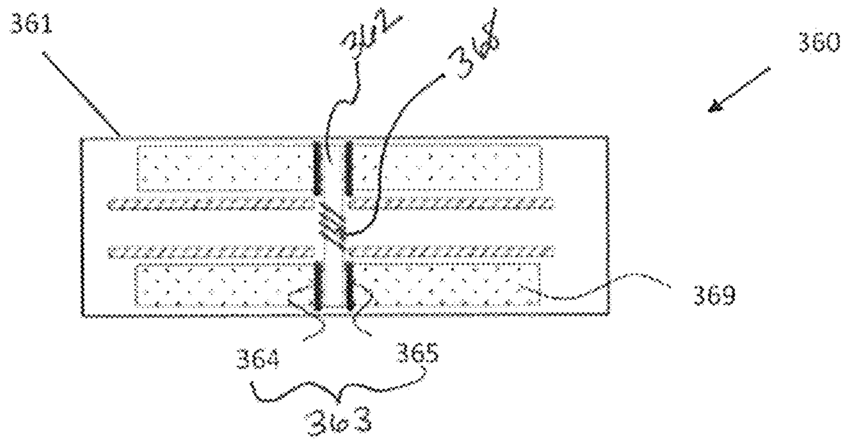
FIG. 10 is an illustration of a liquid storage portion for an aerosol-generating system according to at least one example embodiment.

The cartridge 360 shown in FIG. 10 comprises a substantially cylindrical housing 361 comprising a central airflow passage extending there through. A liquid storage portion is defined between the housing 361 and the central airflow passage, and comprises an annular body of carrier material. The cartridge 360 comprises aerosol-generator in the form of a wick 362 extending across the airflow passage and a heating coil 368 arranged in the air passage and wound around the wick 362. The cartridge 360 comprises a sensor 363 comprising a first electrode 364 and a second electrode 365 arranged at opposite sides of the wick. During vaping, the coil 368 heats the wick 362 and atomises liquid aerosol-forming substrate in the wick 362. This draws liquid aerosol-forming substrate held in the carrier material to the wick and changes the saturation of both the wick 362 and the carrier material. As the saturation of the wick changes, the electrical load between the electrodes, 364, 365 changes.

Figure 11:
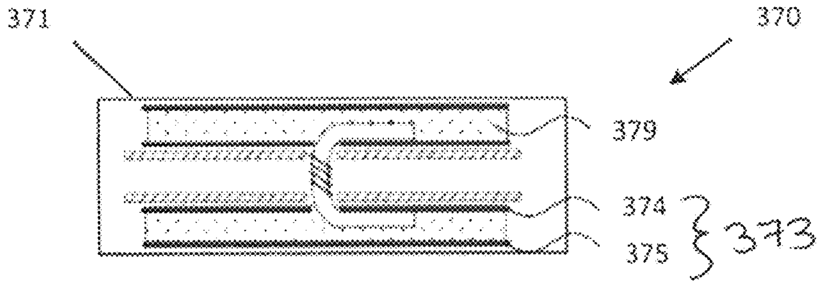
FIG. 11 is an illustration of a liquid storage portion for an aerosol-generating system according to at least one example embodiment.

The cartridge 370 shown in FIG. 11 has a similar construction and arrangement to the cartridge 360 shown in FIG. 10. The cartridge 370 comprises a sensor 373 comprising a first, circularly cylindrical plate electrode 374 arranged around the inner surface of the annular body of carrier material and a second, circularly cylindrical plate electrode 375 arranged around the outer surface of the body of carrier material. The first and second electrodes 375, 374 form concentric circularly cylindrical plates bounding the inner and outer surfaces of the annular body of carrier material. During vaping, the coil heats the wick and vaporizes liquid aerosol-forming substrate in the wick, which draws liquid aerosol-forming substrate held in the carrier material to the wick. This changes the saturation of the carrier material, which changes the electrical load between the electrodes 374, 375.

Figure 12:
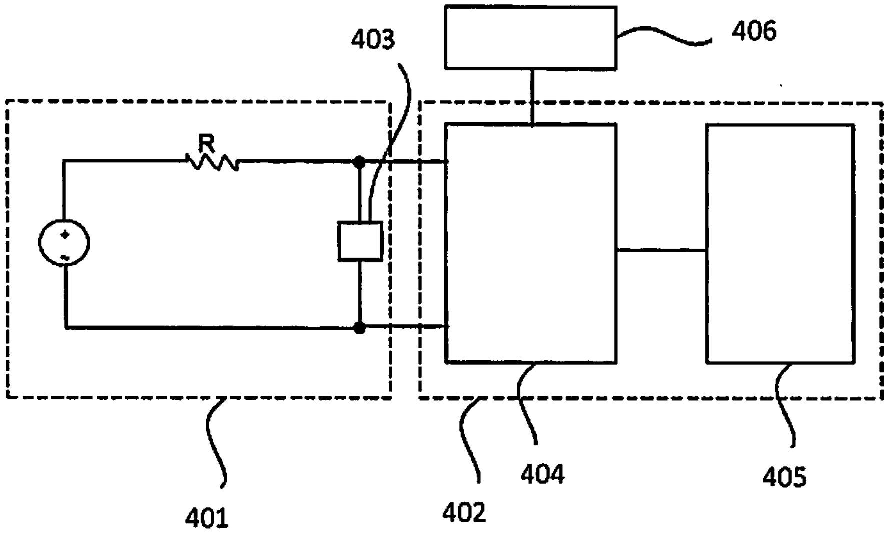
FIG. 12 is a schematic circuit diagram for an aerosol-generating system according to at least one example embodiment.

FIG. 12 shows a schematic circuit diagram of a sensor circuit 401 and control system circuit 402 for an aerosol-generating system according to at least one example embodiment. The sensor circuit 401 comprises a sensor 403, in series with a resistor R and a dedicated sensor power supply to supply an alternating voltage to the sensor 403 at a desired (or, alternatively a predetermined) frequency. The control system circuit 402 comprises control electronics comprising a controller 404 and memory 405. The control electronics are connected to a power supply 406.

In other example embodiments (not shown), the sensor 403 may be connected to the power supply 406, which may be configured to supply power to the sensor circuit 401 and the control system circuit 402. The power supply 406 may also be configured to supply power to the aerosol-generator of the aerosol-generating system and the control system circuit 402 may be configured to control operation of the aerosol-generator.

In at least one example embodiment, an aerosol-generating system comprises one of the cartridges shown in FIGS. 2 to 12. During vaping, the aerosol-generating system is turned on by the adult vaper activating a switch, and a control system of the aerosol-generating system supplies an oscillating measurement signal to the first and second electrode. The control system receives impedance information from the first and second electrodes and compares the measured impedance information to reference impedance information stored in a lookup table in a memory of the control system. The control system matches the measured impedance information to a stored reference impedance information in the lookup table. The stored reference impedance information is associated with an amount information. The control system indicates to an adult vaper an amount associated with the matched stored reference resistance information by displaying the determined amount on an LED display of the aerosol-generating system.

Figure 13:
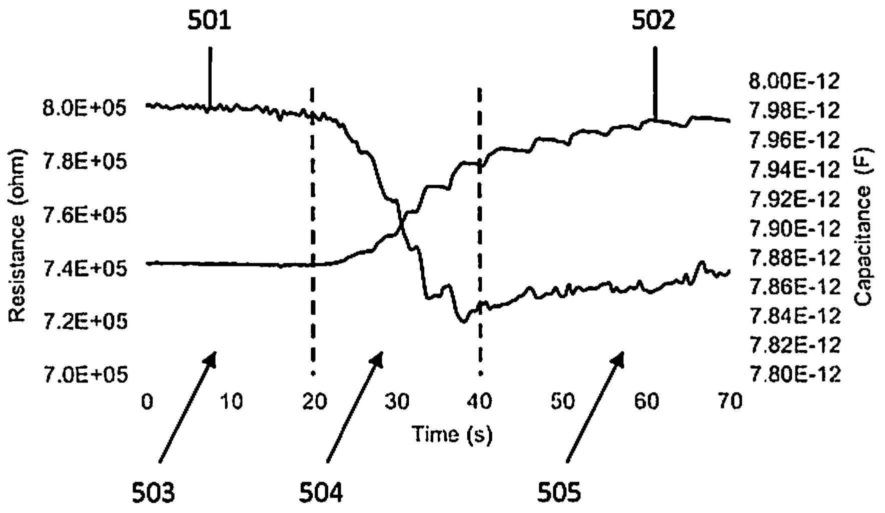
FIG. 13 is a graph of measured capacitances and resistances of a liquid storage portion with respect to time according to at least one example embodiment.

FIG. 13 shows exemplary experimental data for the measured resistance 501 and the measured capacitance 502 over time for an exemplary aerosol-generating system according to the present invention.

The experimental data shown in FIG. 13 was obtained using a liquid storage portion and electrode arrangement as shown in FIG. 5, comprising a substantially cylindrical liquid storage portion having opposing first and second point electrodes, in the form of copper wires, arranged at a central position along the length of the liquid storage portion. The liquid storage portion comprised a carrier material comprising long polypropylene polyethylene (PP-PE) foam that was gradually saturated with a liquid aerosol-forming substrate. The electrodes were in direct contact with the carrier material.

A 2 V alternating voltage was supplied to the first and second electrodes at a frequency of 1 MHz, and the resistance 501 and capacitance 502 across the first and second electrodes were measured using an LCR meter. At a first time period 503, ranging from about 0 to about 20 seconds, the liquid storage portion did not hold liquid aerosol-forming substrate. As shown in FIG. 13, the resistance 501 and the capacitance 502 remained substantially constant during this period. At a second time period 504, ranging from about 20 to about 40 seconds, the liquid storage portion was gradually filled with liquid aerosol-forming substrate. As shown in FIG. 13, the resistance 501 decreased and the capacitance 502 increased as the amount of liquid aerosol-forming substrate held in the liquid storage portion was increased over this time period. At a third time period 505, after about 40 seconds, the carrier material was fully saturated with liquid aerosol-forming substrate. As shown in FIG. 13, the resistance 501 and capacitance 502 remained substantially constant during this period.

This procedure may be performed during calibration of an aerosol-generating system. In a calibration procedure, desired (or, alternatively a predetermined) amounts of liquid aerosol-forming substrate may be introduced into the liquid storage portion, and at least one of the inductance, resistance or capacitance may be measured. The measurements may be stored in a lookup table in a memory of the control system and each measurement may be associated with the desired (or, alternatively a predetermined) amount of liquid aerosol-forming substrate.

In another example embodiment, using the exemplary data shown in FIG. 13, a control system of an aerosol-generating system receives sensed resistance information from the first and second electrode. The received resistance information corresponds to a resistance of about $7.4\times10^5$ Ohms. The control system compares the measured resistance information to resistance reference information stored in a lookup table. The lookup table comprises a stored reference resistance value of $7.4\times10^5$ Ohms, which is associated with a stored amount information of 0 millilitres. The control system matches the sensed resistance information with the stored reference resistance information of $7.4\times10^5$ Ohms, and the control system displays the associated stored amount of 0 ml to an adult vaper on an LED display of the aerosol-generating system.

In some example embodiments, on determining that the liquid storage portion holds 0 ml (i.e. the liquid storage portion is empty), the control system may reduce and/or substantially prevent power from being supplied to aerosol-generator of the aerosol-generating system from the power supply. The control system may be configured to continue to reduce and/or substantially prevent power from being supplied to the aerosol-generating system until the determined amount of liquid aerosol-forming substrate reaches or exceeds a desired (or, alternatively a predetermined) threshold amount.

It will be appreciated that the relationship between the measured resistance, capacitance and impedance and the amount of liquid aerosol-forming substrate held in the liquid storage portion will depend on the type and relative positions of the electrodes in the liquid storage portion.

In some example embodiments, the control system may determine the amount of liquid aerosol-forming substrate held in the liquid storage portion periodically at desired (or, alternatively a predetermined) intervals. In other example embodiments, the control system may determine the amount of liquid aerosol-forming substrate held in the liquid storage portion when prompted by an adult vaper, such as when the adult vaper presses a switch on the housing of the aerosol-generating system.

In some example embodiments, the control system may be configured to determine the amount of liquid aerosol-forming substrate held in the liquid storage portion by calculation. In at least one example embodiment, the control system may be configured to measure the capacitance. The sensor may comprise substantially planar first and second capacitor plates having a surface area A. The second capacitor plate may be arranged substantially parallel to the first capacitor plate, and at a separation d from the first capacitor plate. The liquid storage portion may be arranged between the first and second capacitor plates (see FIG. 9).

In this example embodiment, the measured capacitance C is related to the surface area A of the first and second capacitor plates, and the separation d, as shown in Equation 1.

$$C = \frac{k\varepsilon_0 A}{d} \qquad \text{Equation 1}$$

C is the measured capacitance, k is the relative permittivity of the dielectric between the first and second capacitor plates, $\varepsilon_0$ is the vacuum permittivity, A is the surface area of the first and second capacitor plates and d is the separation between the first and second capacitor plates. The measured capacitance C, the vacuum permittivity $\varepsilon_0$, the surface area A of the first and second capacitor plates and the separation d between the first and second capacitor plates are known. The known values can be used to determine the relative permittivity of the dielectric k.

When combining dielectrics, it may be assumed that an average dielectric value can be obtained by multiplying the volume fraction of each component by its corresponding dielectric and summing the determined values.

Since the dielectric constants of the liquid aerosol-forming substrate, air and carrier material held in the liquid storage portion are known, the volume fraction of liquid aerosol-forming substrate may be calculated. Since the total volume V of the liquid storage portion is also known, the volume of aerosol-forming substrate held in the liquid storage portion may also be calculated.

For example, a liquid aerosol-forming substrate may comprise a 50:50 mix of VG (k~42) and PG (k~32) (neglecting small amounts of nicotine and flavorant). The total average dielectric constant $k_{AFS}$ of the liquid aerosol-forming substrate is 37, as shown in Equation 2.

$$k_{AFS} = (42\times0.5) + (32\times0.5) = 37 \qquad \text{Equation 2}$$

In some example embodiments, the liquid storage portion does not comprise carrier material. In these example embodiments, the dielectric between the first and second capacitor plates comprises liquid aerosol-forming substrate, air or a combination of liquid aerosol-forming substrate and air. The total average dielectric constant between the first electrode and the second electrode when the liquid storage portion is filled with the liquid aerosol-forming substrate (k~37) is about 37. In use, when half of the liquid aerosol-forming substrate has been consumed and replaced by air (k~1), the total average dielectric constant $k_{HALF}$ between the first electrode and the second electrode is about 19, as shown in Equation 3.

$$k_{HALF} = (37 \times 0.5) + (1 \times 0.5) = 19 \quad \text{Equation 3}$$

Once all of the liquid aerosol-forming substrate held in the liquid storage portion has been consumed and replaced by air (k~1), the total average dielectric constant between the first electrode and the second electrode $k_{EMPTY}$ is about 1.

In other example embodiments, the liquid storage portion comprises carrier material, and the liquid aerosol-forming substrate (k~37) is soaked in the carrier material. The carrier material may be a homogeneous polypropylene foam (k~2.2) that can absorb a mass of liquid aerosol-forming substrate equal to three times the weight of the foam. In these embodiments, when the carrier material is fully saturated with liquid aerosol-forming substrate and there is no air in the foam, the total average dielectric constant $k_{FULL}$ between the first electrode and the second electrode is about 28, as shown in Equation 4.

$$k_{FULL} = (0.25 \times 2.2) + (0.75 \times 37) = 28 \quad \text{Equation 4}$$

During vaping, when half of the liquid aerosol-forming substrate has been consumed and replaced by air (k~1), the total average dielectric constant $k_{HALF}$ between the first electrode and the second electrode is about 5, as shown in Equation 5.

$$k_{HALF} = (0.25 \times 2.2) + (0.375 \times 37) + (0.375 \times 1) = 5 \quad \text{Equation 5}$$

Once all of the liquid aerosol-forming substrate held in the liquid storage portion has been consumed and replaced by air, the total average dielectric constant $k_{EMPTY}$ between the first electrode and the second electrode is about 1.3, as shown in Equation 6.

$$k_{EMPTY} = (0.25 \times 2.2) + (0.75 \times 1) = 1.3 \quad \text{Equation 6}$$

The volume fraction of liquid aerosol-forming substrate held in the liquid storage portion may be calculated from the total average dielectric constant determined from the measured capacitance and from the known dielectric constants of the liquid aerosol-forming substrate, air and carrier material held in the liquid storage portion.

The volume fraction of liquid aerosol-forming substrate may be indicated to an adult vaper as the amount of liquid aerosol-forming substrate held in the liquid storage portion. The volume of liquid aerosol-forming substrate may be indicated to an adult vaper.

It will be appreciated that different capacitor geometries will require different calculations to determine the amount of liquid aerosol-forming substrate held in the liquid storage portion.

In at least one example embodiment, the liquid storage portion may be arranged between two capacitor plates that are formed as concentric cylinders (see the sensor shown in FIG. 11). The liquid storage portion forms an annular cylinder between the first and second capacitor plates. The inner capacitor plate has a radius a, and the outer capacitor plate has a radius b, and the capacitor plates each have a length L. The measured capacitance C is related to the inner and outer radii a, b and the length L of the capacitor plates, as shown in Equation 7.

$$C = \frac{2\pi k \varepsilon_0 L}{\ln\left[\frac{b}{a}\right]} \quad \text{Equation 7}$$

The length L of the capacitor plates, the inner and outer radii a, b and the vacuum permittivity $\varepsilon_0$ are known. The total average relative permittivity k between the first electrode and the second electrode may be determined from the measured capacitance and the volume fraction of liquid aerosol-forming substrate held in the liquid storage portion may be calculated using the known relative permittivities of the liquid aerosol-forming substrate, air and carrier material that may be held in the liquid storage portion.

It will be appreciated that similar calculations may be performed for other sensor geometries.

Similar calculations may be performed to determine the amount of liquid aerosol-forming substrate held in the liquid storage portion using measurements other electrical quantities. In at least one example embodiment, the amount of liquid aerosol-forming substrate held in the liquid storage portion may be determined from measurements of the resistance between the first electrode and the second electrode. The total average electrical resistivity (ρ) between the first electrode and the second electrode may be calculated from measurements of the resistance between the first and second electrodes. For the planar plate electrode example shown above in FIG. 9, the resistance R between the first electrode and the second electrode may be measured, and the total average resistivity ρ between the first electrode and the second electrode may be calculated, for example, using Pouillet's law, as shown in Equation 8.

$$R = \rho\frac{d}{A} \quad \text{Equation 8}$$

The measured resistance R, the separation d between the first and second electrodes and the surface area A of the first and second electrodes are known, and may be used to determine the total average resistivity ρ between the first electrode and the second electrode. The volume fraction of liquid aerosol-forming substrate held in the liquid storage portion may be determined using the known electrical resistivities of the liquid aerosol-forming substrate, air and carrier material in a similar manner to the calculation of the volume fraction using the known permittivities described above in Equations 2 to 6.

In other example embodiments, the control system may be configured to calculate the amount of liquid aerosol-forming substrate held in the liquid storage portion from measured values of the electrical quantity by notionally dividing the liquid storage portion into two sections, a first section filled with liquid aerosol-forming substrate and a second section filled with air.

In at least one example embodiment, an aerosol-generating system may comprise a sensor comprising capacitor having first and second capacitor plates. The first and second capacitor plates may be substantially planar and have a surface area A. The second capacitor plate may be arranged substantially parallel to the first capacitor plate, and at a separation d from the first capacitor plate. The entire liquid storage portion may be arranged between the first and second capacitor plates (see FIG. 9).

The control system may be configured to notionally divide the capacitor into two capacitors connected in parallel, a first capacitor, having a capacitance $C_1$, and a second capacitor, having a capacitance $C_2$. This may notionally divide the liquid storage portion into two sections, a first section filled with liquid aerosol-forming substrate, arranged between the capacitor plates of the first capacitor, and a second section filled with air, arranged between the capacitor plates of the second capacitor.

The measured capacitance C is the total capacitance of the first and second capacitors. This is calculated by summing the capacitances $C_1$, $C_2$ of the first and second capacitors. By summing the capacitances $C_1$, $C_2$ of the first and second capacitors, the total capacitance C may be calculated, as shown in Equation 9.

$$C = \frac{\varepsilon_0}{d}(k_1 A_1 + k_2 A_2) \qquad \text{Equation 9}$$

As the liquid aerosol-forming substrate is consumed from the liquid storage portion, the surface area $A_1$ of the first capacitor decreases and the surface area $A_2$ of the second capacitor increases. The total surface area A of the first and second capacitor plates remains constant, and is the sum of the surface areas of the first and second capacitors. Equation 9 may be rearranged to determine the surface area $A_1$ of the first capacitor, which may be calculated using the known values for the total surface area A of the capacitor, the separation d between the first and second capacitor plates, the permittivity of the liquid aerosol-forming substrate $k_1$ and the permittivity of air $k_2$. The volume $V_1$ of the first section, which is the volume of liquid aerosol-forming substrate held in the liquid storage portion, may be determined by multiplying the surface area $A_1$ of the first section and the separation d between the capacitor plates.

In another example embodiment (not shown) the liquid storage portion is arranged between two capacitor plates that are formed as concentric cylinders (for example, see FIG. 11). The first, inner capacitor plate has a radius a, and the second, outer concentric cylinder has a radius b. The liquid storage portion forms an annular cylinder between the first and second capacitor plates.

The control system is configured to notionally divide the capacitor into two capacitors connected in parallel, a first capacitor spanning the section of the liquid storage portion holding liquid aerosol-forming substrate, having a length $L_1$, and a second capacitor spanning the section of the liquid storage portion holding air, having a length $L_2$. As the liquid aerosol-forming substrate is consumed from the liquid storage portion, the length $L_1$ of the first section decreases and the length $L_2$ of the second section increases. The total length L of the first and second capacitor plates remains constant.

By summing the capacitance $C_1$ of the first capacitor and the capacitance $C_2$ of the second capacitor, the total capacitance C, which is the measured capacitance, may be calculated, as shown in Equation 10.

$$C = \frac{2\pi\varepsilon_0}{\ln\left(\frac{b}{a}\right)}(k_1 L_1 + k_2 L_2) \qquad \text{Equation 10}$$

Equation 10 may be rearranged to determine the length $L_1$ of the first section, which may be calculated using the known values for the total length L of the first and second capacitor plates, the radius a of the first capacitor plate, the radius b of the second capacitor plate, the permittivity $k_1$ of the liquid aerosol-forming substrate and the permittivity $k_2$ of air. The volume $V_1$ of the first section, which corresponds to the volume of liquid aerosol-forming substrate held in the liquid storage portion, may be determined by multiplying the length $L_1$ of the first section by the annular surface area between the first and second capacitor plates, as shown in Equation 11.

$$V_1 = \pi L_1 (b^2 - a^2) \qquad \text{Equation 11}$$

It will be appreciated that the control system may be configured to perform similar calculations for other sensor geometries and for other sensed electrical quantities.

In at least one example embodiment, where the control system is configured to measure the resistance between the first electrode and the second electrode, the control system may be configured to notionally divide the first and second electrodes into two resistors connected in parallel. The liquid storage portion may also be notionally divided into two sections, a first section filled with liquid aerosol-forming substrate and spanned by the first resistor, and a second section filled with air and spanned by the second resistor. The measured resistance is total resistance of the first and second resistors. Since the first and second resistors are connected in parallel, the total resistance is the sum of the inverse of the resistance of the first resistor and the inverse of the resistance of the second resistor. The volume of the first section, which is the section filled with the liquid aerosol-forming substrate, may be calculated using the measured resistance and by applying the known parameters of the first and second resistors to Pouillet's law (see Equation 8).

To improve the accuracy of the calculation using the notional division of the electrodes and the liquid storage portion, the surface of the liquid aerosol-forming substrate may be held substantially perpendicular to the first and second capacitor plates when the measurements of the electrical quantity are made. This may be achieved by arranging the liquid storage portion with at least one channel sufficiently narrow that capillary forces act on the liquid aerosol-forming substrate held in the at least one channel. This may also be achieved by providing the liquid storage portion with a tilt sensor, and configuring the control system to determine the amount of liquid aerosol-forming substrate held in the liquid storage portion from measurements of the electrical quantity when the liquid storage portion is oriented appropriately.

It will be appreciated that in other example embodiments (not shown), the cartridges described in relation to FIGS. 2 to 12 may not be cartridges, but rather may be integral parts of aerosol-generating systems, such as the aerosol-generating system shown in FIG. 1. It will also be appreciated that the main unit may be provided with sensors, such as the pairs of electrodes shown in FIGS. 2 to 12, arranged to sense electrical quantities of liquid storage portions of cartridges received by the main units.

It will be appreciated that features described for one example embodiment may be provided in other example embodiments. In particular, it will be appreciated that cartridges and aerosol-generating systems according to at least one example embodiment may comprise more than one means of determining the amount of liquid aerosol-forming substrate held in the liquid storage portion, such as more than one pair of first and second electrodes.

We claim:

1. An apparatus for generating an aerosol, comprising:

a housing defining a cavity, the cavity configured to receive a cartridge, the cartridge configured to hold an aerosol-forming substrate, the cartridge including a cartridge housing, the cartridge housing having a first end and a second end, the cartridge housing containing the aerosol-forming substrate, and the cartridge housing including, a platform of electrically insulating material between the first end of the cartridge housing and the second end of the cartridge housing, the platform forming a portion of the cartridge housing, the platform formed of a flexible, polymer sheet, the flexible, polymer sheet adhered to a surface of the cartridge housing between and entirely spaced from the first end of the cartridge housing and the second end of the cartridge housing, such that the platform conforms to a shape of the cartridge housing, the cartridge housing being cylindrical;

a vaporizer adjacent a first end of the cartridge housing;

a sensor within the cartridge, the sensor including, a first electrode, and a second electrode, the first electrode and the second electrode coupled to the platform;

a control system in the housing, the control system configured to measure an electrical quantity between the first electrode and the second electrode, the electrical quantity including a capacitance, and determine an amount of the aerosol-forming substrate held in the cartridge based on the electrical quantity.

2. The apparatus according to claim 1, wherein the sensor is around an inner surface of the cartridge.

3. The apparatus according to claim 2, wherein the first electrode is adjacent the first end of the cartridge housing, and the second electrode comprises a ring electrode, the ring electrode is adjacent the second end of the cartridge housing, the second end of the cartridge housing being opposite the first end of the cartridge housing.

4. The apparatus according to claim 1, wherein the first electrode and the second electrode comprise:

point electrodes extending through opposing sides of the cartridge.

5. The apparatus according to claim 1, wherein the first electrode and the second electrode are interdigitated.

6. The apparatus according to claim 1, wherein the vaporizer comprises a wick.

7. The apparatus according to claim 1, wherein the control system is configured to determine the amount of the aerosol-forming substrate held in the cartridge based on the measured electrical quantity and reference electrical quantity information stored in a memory of the control system.

8. The apparatus according to claim 1, wherein the vaporizer is configured to receive the aerosol-forming substrate from the cartridge; and the control system is further configured to control operation of the vaporizer based on the determined amount of the aerosol-forming substrate and a threshold amount stored in the control system.

9. The apparatus according to claim 8, wherein the control system is configured to reduce operation of the vaporizer if the determined amount of the aerosol-forming substrate is below the threshold amount.

10. The apparatus according to claim 1, wherein the control system is further configured to supply the first electrode and the second electrode with an oscillating measurement signal.

11. The apparatus according to claim 1, further comprising:

a wick configured to receive the aerosol-forming substrate from the cartridge;

a heater configured to heat the wick and vaporize the aerosol-forming substrate; and a power source configured to supply power to the heater;

wherein the control system is further configured to control the supply of power from the power source to the heater based on the amount of the aerosol-forming substrate held in the cartridge.

* * * * *